United States Patent
Shoji

(10) Patent No.: US 9,268,252 B2
(45) Date of Patent: Feb. 23, 2016

(54) IMAGE FORMING APPARATUS AND METHOD WITH ADDITIONAL EXPOSURE OF PHOTORECEPTOR DRUM BASED ON CYCLE OF SCREEN

(71) Applicant: CANON KABUSHIKI KAISHA, Tokyo (JP)

(72) Inventor: Atsushi Shoji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/680,555

(22) Filed: Apr. 7, 2015

(65) Prior Publication Data

US 2015/0293466 A1  Oct. 15, 2015

(30) Foreign Application Priority Data

Apr. 15, 2014  (JP) ................................. 2014-083860

(51) Int. Cl.
  H04N 1/29  (2006.01)
  H04N 1/405  (2006.01)
  H04N 1/409  (2006.01)
  G06K 15/14  (2006.01)
  G03G 15/043  (2006.01)
  G06K 15/02  (2006.01)
  H04N 1/00  (2006.01)

(52) U.S. Cl.
  CPC ............. *G03G 15/043* (2013.01); *G06K 15/14* (2013.01); *G06K 15/1881* (2013.01); *H04N 1/00254* (2013.01); *H04N 1/295* (2013.01); *H04N 1/405* (2013.01); *H04N 1/409* (2013.01)

(58) Field of Classification Search
  None
  See application file for complete search history.

(56) References Cited

U.S. PATENT DOCUMENTS

| | | | | |
|---|---|---|---|---|
| 5,767,982 A * | 6/1998 | Takahashi | .......... | H04N 1/40037 358/300 |
| 5,856,841 A | 1/1999 | Shinohara et al. | | |
| 7,292,798 B2 * | 11/2007 | Furukawa | .......... | G03G 15/1625 399/46 |
| 7,844,200 B2 * | 11/2010 | Kanai | ................ | G03G 15/0208 399/128 |
| 7,952,752 B2 | 5/2011 | Shoji | | |
| 9,063,450 B2 * | 6/2015 | Shoji | .................... | G03G 15/011 |

FOREIGN PATENT DOCUMENTS

| | | |
|---|---|---|
| JP | 09-169136 A | 6/1997 |
| JP | 2003-312050 A | 11/2003 |

\* cited by examiner

*Primary Examiner* — Scott A Rogers
(74) *Attorney, Agent, or Firm* — Fitzpatrick, Cella, Harper & Scinto

(57) ABSTRACT

An image forming apparatus applies a dither matrix to multi-valued image data. Then, the apparatus performs an exposure on a photoreceptor drum based on the image data obtained by using the applied dither matrix. In this process, the apparatus performs additional amount of exposure on the photoreceptor drum in a cycle equal to the cycle of the dither matrix, in addition to an amount of the exposure based on the obtained image data.

14 Claims, 16 Drawing Sheets

RENDERING AREA :
NON-RENDERING AREA
= 4 : 12

BRIGHTER          DARKER

RENDERING AREA :
NON-RENDERING AREA
= 3 : 13

RENDERING AREA :
NON-RENDERING AREA
= 5 : 11

IMAGE FORMING APPARATUS AND METHOD WITH ADDITIONAL EXPOSURE OF PHOTORECEPTOR DRUM BASED ON CYCLE OF SCREEN

BACKGROUND OF THE INVENTION

1. Field of the Invention

The present invention relates to an image forming apparatus having a plurality of developing units and image forming method.

2. Description of the Related Art

Generally, an electrophotographic image forming apparatus performs a repeated cycle of operations involving charging, latent image formation by lithography, development, transfer, discharging, and cleaning. Also, a color electrophotographic image forming apparatus is provided with a developing unit for each color thereby to perform the above-described cycle of operations. Specifically, the color electrophotographic image forming apparatus having plural developing units performs processing which involves forming an image for a single color by the developing unit, transferring the image (or a toner image) to a transfer body, and conveying the transfer body thereby to convey the toner image to the next developing unit. Here, among the plural developing units, the developing unit which transfers the toner image first is defined as an upstream side of a printing unit, and the developing unit which transfers the toner image thereafter is defined as a downstream side thereof.

A discharging unit to eliminate electric charges remaining on a photoreceptor drum has recently been omitted for the purposes of cost reduction. In a case where the discharging unit is omitted, however, a charged image remaining after the transfer of the image affects the following photoreceptor drum on the downstream side and hence affects a printed result on the downstream side. For example, the toner image formed on a transfer belt by the developing unit on the upstream side may also act as the charged image containing electric charges. The toner image containing the electric charges applies the electric charges to the photoreceptor drum on the downstream side which contacts the transfer belt. The photoreceptor drum on the downstream side is not subjected to the discharging by the discharging unit, and therefore causes a phenomenon called a ghost due to the influence of the toner image containing the electric charges on the upstream side.

There is no approach suitable for suppression of the above-described ghost phenomenon. For example, one possible approach to suppress the ghost phenomenon is to increase a charging voltage at which a charging unit charges the developing unit. The reason is that an increase in the charging voltage to the photoreceptor drum leads to a reduction in relative strength of an electric potential reversely transferred from the transfer belt to the photoreceptor drum. With the charging voltage remaining increased, however, there also arises a problem such as excessive consumption of the toner or scattering of the toner onto an unintended portion. To address this problem, although exposure is performed only on a rendered area for typical image formation, feeble light exposure may be performed also on a non-rendered area other than the rendered area thereby to reduce the charging voltage to its allowable range. Although Japanese Patent Laid-Open Nos. H09-169136(1997) and 2003-312050 disclose a technology of performing exposure on the non-rendered area, the technology is not for the purpose of suppressing the ghost phenomenon and thus gives no consideration to a problem resulting from the suppression of the ghost phenomenon.

SUMMARY OF THE INVENTION

An image forming apparatus according to the present invention includes: an applying unit configured to apply a dither matrix to multi-valued image data; and an exposure unit configured to perform an exposure on a photoreceptor drum based on the image data obtained by using the dither matrix applied by the applying unit. The exposure unit also performs additional amount of exposure on the photoreceptor drum in a cycle equal to a cycle of the dither matrix, in addition to an amount of the exposure based on the obtained image data.

According to the present invention, an image forming apparatus which outputs a high-quality image can be provided.

Further features of the present invention will become apparent from the following description of exemplary embodiments (with reference to the attached drawings).

DESCRIPTION OF THE EMBODIMENTS

Embodiments for carrying out the present invention will be described below by using the drawings. It is to be understood that the following embodiments are illustrative only and are not intended to limit the scope of the present invention.

Incidentally, before description of specific embodiments, description will firstly be given with regard to a cause of occurrence of the above-described ghost phenomenon, problems caused by measures against the ghost phenomenon, and the like. Then, after description of outlines of the embodiments, the specific embodiments will be described.

[Potential Variations in Electrophotographic Photoreceptor]

Figure 1:
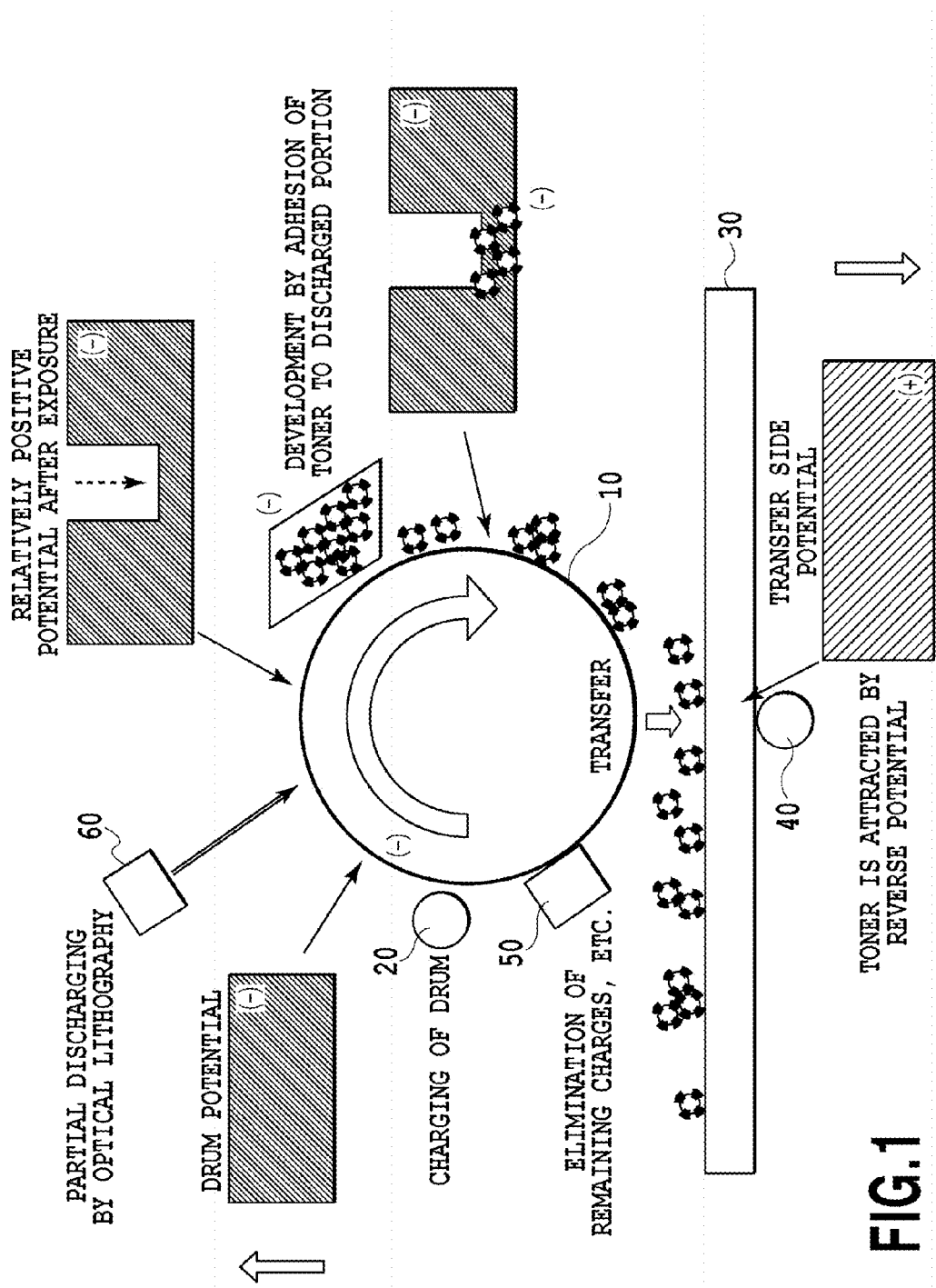
FIG. 1 is a representation illustrating an example of potential variations in an electrophotographic photoreceptor drum.

FIG. 1 is a schematic representation illustrating potential variations in a general electrophotographic photoreceptor. A charging unit 20 charges a photoreceptor drum 10 with a negative potential, and thereby, the potential of the photoreceptor drum 10 becomes negative. Then, a lithography unit 60 lithographs an image on the photoreceptor drum 10 by light. In other words, the lithography unit 60 forms a latent image on the photoreceptor drum 10. The negative potential disappears from an optically lithographed portion of the photoreceptor drum 10, so that this portion bears a relatively positive potential. In other words, the image lithographed portion may be said to be a discharged portion. Toner adheres only to the discharged portion by being brought close to the photoreceptor drum 10 including the discharged portion. In other words, the toner adheres only to the latent image lithographed portion. The photoreceptor drum 10 having the toner adhering thereto is brought into intimate contact with a transfer body 30 and is subjected to a positive reverse potential by a transfer unit 40, and thereby, a toner image is attracted to the transfer body 30. A discharging unit 50 eliminates electric charges remaining on the photoreceptor drum 10.

[Potential Variations in Image Forming Apparatus Having Plural Developing Units]

Figure 2:
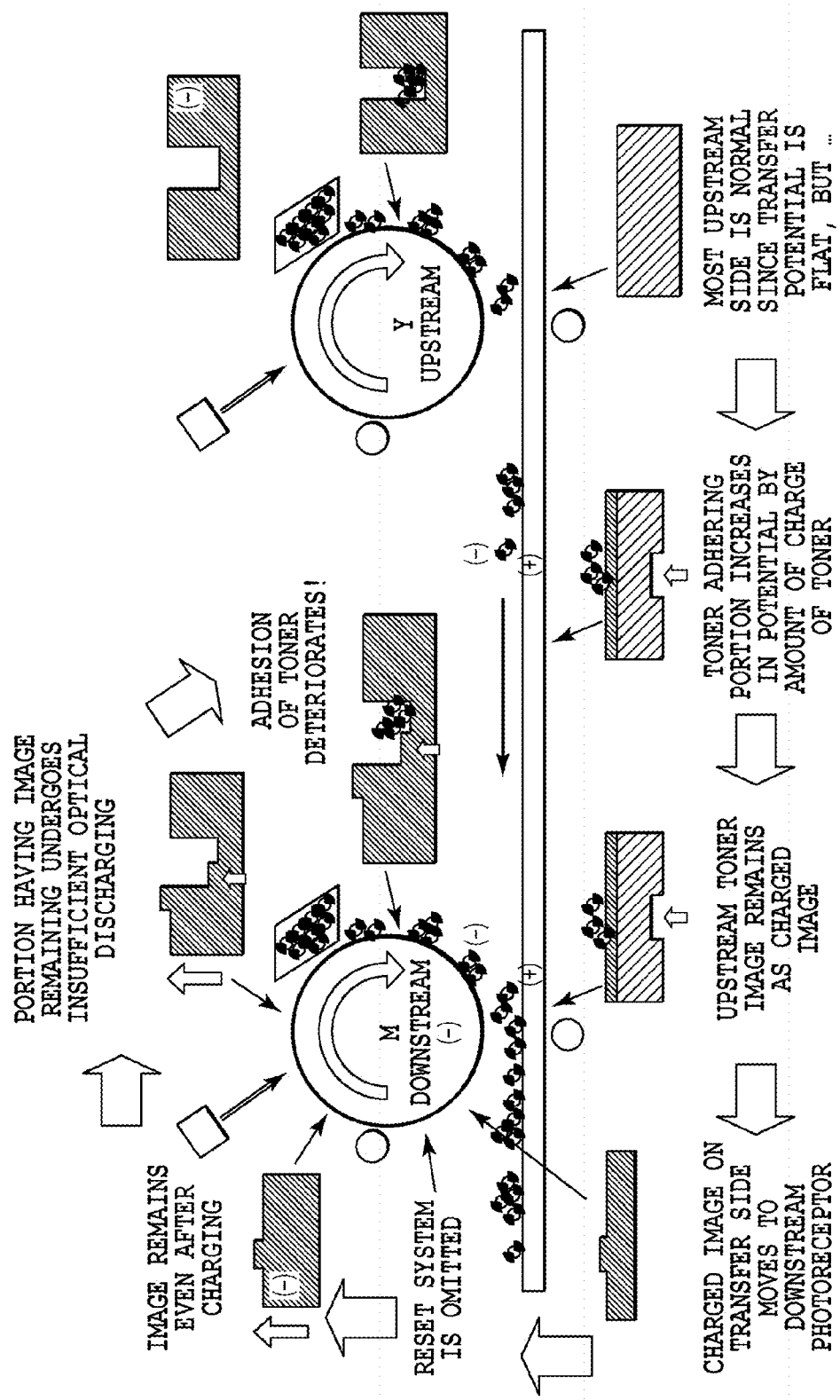
FIG. 2 is a representation illustrating an example of potential variations in an image forming apparatus having plural developing units.

Next, description will be given with regard to an example of potential variations in an image forming apparatus further having plural developing units, with the discharging unit 50 of FIG. 1 omitted. FIG. 2 is a schematic representation illustrating the example of the potential variations in the image forming apparatus having the plural developing units.

Images formed on color electrophotographic photoreceptor drums are sequentially combined together on a transfer belt; however, mutual interference occurs through toner images on the transfer belt and thus causes the occurrence of a ghost. Specific description will be given below.

Description will be given assuming that a developing unit for yellow (Y) is arranged on the upstream side as the side on which the toner image is first carried, and that a developing unit for magenta (M) is arranged on the downstream side. In the developing unit for yellow (Y), a yellow toner image adheres to the transfer belt, as described with reference to FIG. 1. The toner image does not adhere to the transfer belt on the upstream side thereof, and thus, the potential of the transfer belt remains flat. Then, the yellow toner image adheres to the transfer belt, and thereby, a toner adhering portion changes in its potential by the amount of charge of the toner. In other words, the toner image developed on the transfer belt before being fixed on paper is held by the electric charge of the charged toner, and hence the toner image in itself may also be said to be a charged image.

Then, in the developing unit for magenta (M) on the downstream side, the toner image is transferred to the transfer belt, and, at the same time, the charged image formed by the toner image on the transfer belt on the upstream side thereof is reversely transferred to the potential of the photoreceptor drum on the downstream side and thus affects the potential of the photoreceptor drum on the downstream side. In other words, on the photoreceptor drum for magenta (M) on the downstream side, the charged image on the transfer belt moves to the photoreceptor. Thus, in a case where charging is performed by the charging unit on the downstream side, the charged image on the upstream side remains. A portion having the charged image remaining undergoes insufficient discharging during lithographing performed thereafter by the lithography unit, which in turn results in poor adhesion of the toner.

Thus, the reverse transfer of the charged image from the transfer belt to the photoreceptor drum exerts an influence called the ghost upon different colors.

Figure 3:
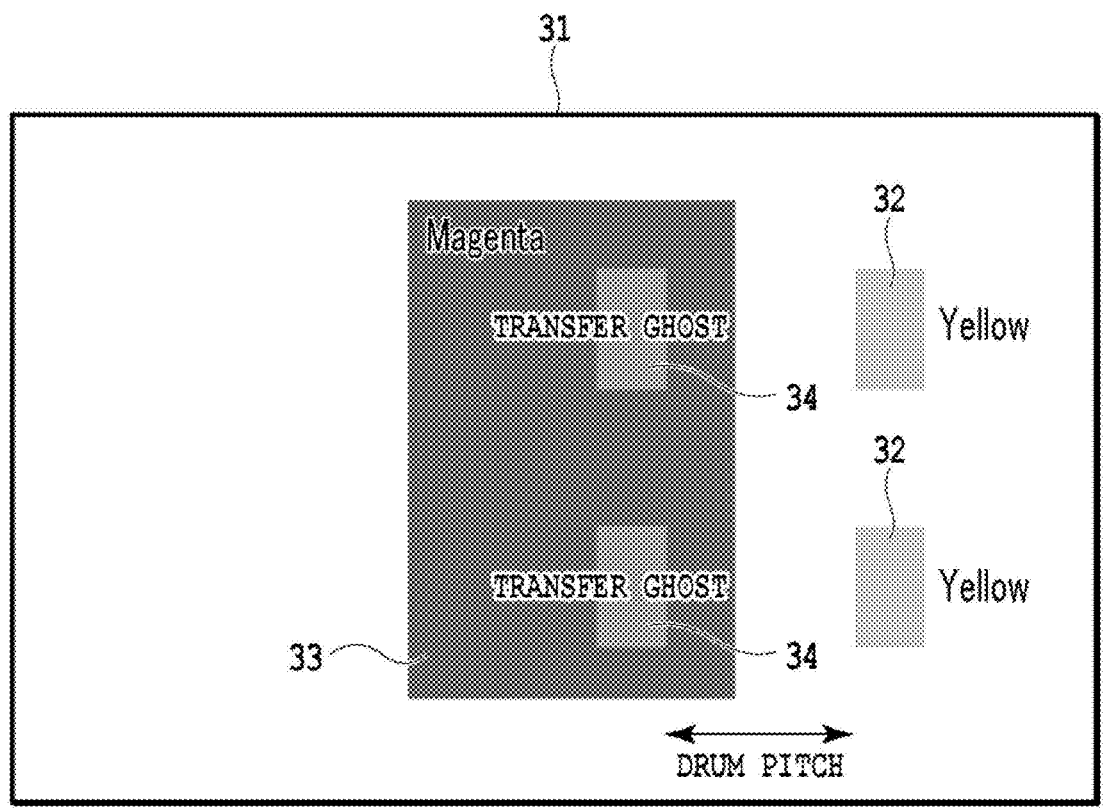
FIG. 3 is a view of assistance in explaining a ghost phenomenon.

FIG. 3 is a view of assistance in explaining the ghost phenomenon. It is assumed that yellow patches 32 are formed on the right-hand side of a sheet of paper 31, and a magenta patch 33 is formed at the center thereof. Here, the ghost phenomenon in which a magenta color becomes pale due to deterioration in the adhesion of the toner occurs in portions at a distance of drum pitch (or a distance traveled after one rotation of the photoreceptor drum) from portions in which the yellow patches 32 are formed. Thus, the ghost is a ghost between different colors in which the ghost occurs in different colors rather than in the same color, and the ghost occurs at a location at a distance in terms of time and space, and thus, with correction by image processing, the ghost is difficult to handle. Therefore, in a printing unit, measures may be taken so as to prevent the ghost from occurring.

[Potential Variations Produced by Performing Feeble Light Exposure on Non-Lithographing Area]

Figure 4:
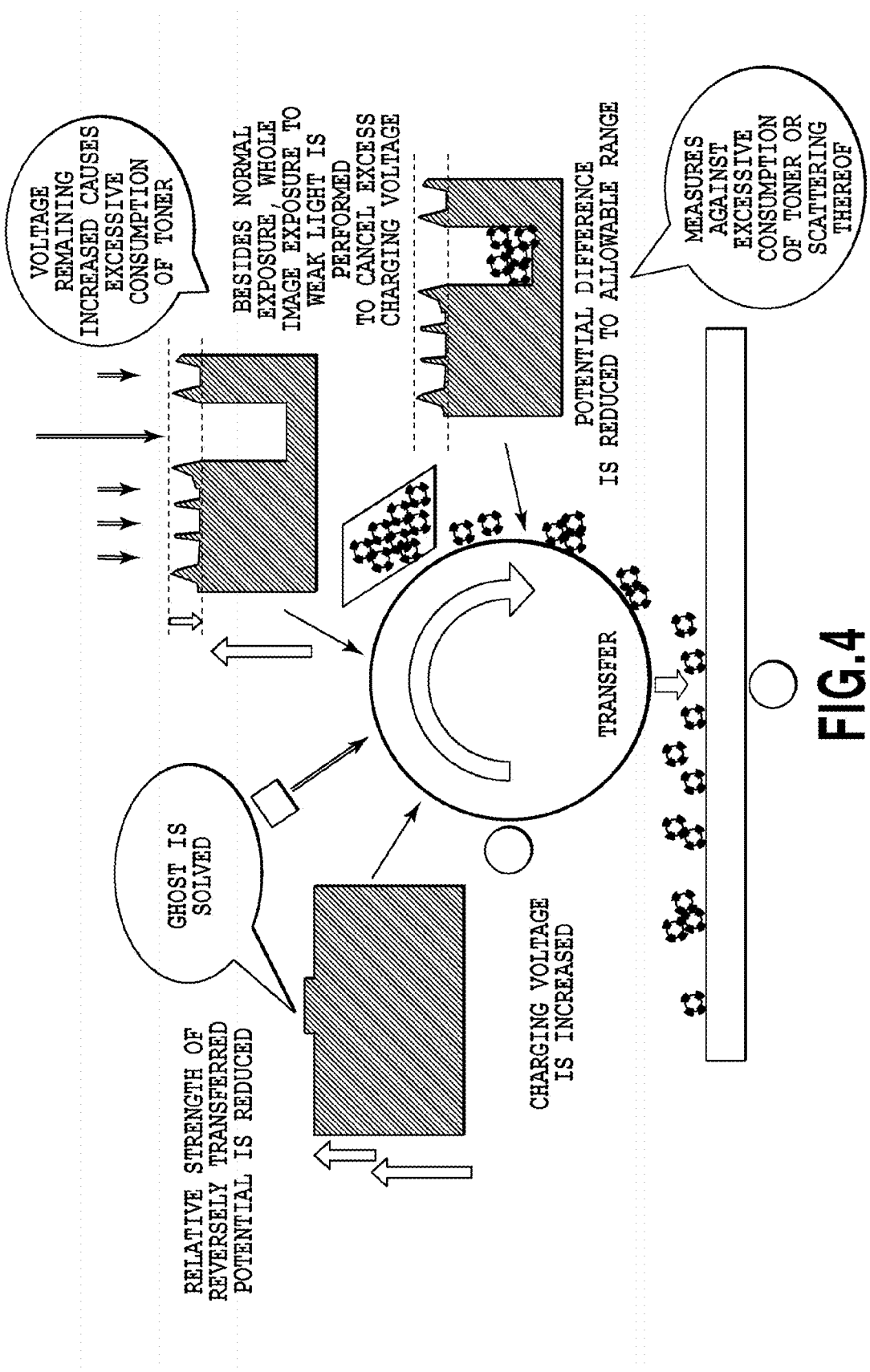
FIG. 4 is a representation illustrating an example of potential variations produced by performing feeble light exposure on a non-rendered area.

FIG. 4 is a representation illustrating an example of potential variations produced by performing feeble light exposure on a non-lithographing area. As illustrated in FIG. 4, first, the charging unit increases a charging voltage, and the lithography unit performs the feeble light exposure on the non-rendered area, thereby enabling image formation with the ghost suppressed. The amount of electric charge which the toner can bear remains constant. Then, in a normally formed toner image, potential strength of the charged image formed by the toner image, from which a reversely transferred image originates, remains constant regardless of a charging potential. Therefore, the charging unit increases the charging potential to be charged into the photoreceptor drum, thereby relatively lessening the influence of the charged image formed by the reversely transferred toner. In other words, a process of increasing the charging potential suppresses the ghost between different colors.

However, the increased charging potential causes another problem.

As previously mentioned, the amount of electric charge which the toner can bear remains constant, and, in the developing unit in which the charging potential is too high, the potential is high and correspondingly leads to an excessive supply of the toner to an optically lithographed latent image. The excessive supply of the toner causes a drawn line to become heavier than that in the rendering image or irregularly extend out beyond a latent image area, which in turn becomes a factor that causes tailing or scattering. Thus, there is not only a very undesirable result in respect of the image, but also an excessive amount of toner consumed.

Therefore, a process for correcting the increased charging voltage may be performed. Specifically, in order to correct the charging voltage, feeble light exposure is performed also on the non-rendered area thereby to cancel an excess charging voltage. Subsequent to the charging unit, the lithography unit performs processing. A general lithography unit performs control so as to emit light onto a rendered area and emit no light onto the non-rendered area. This is replaced by control such that strong light is emitted onto the rendered area and feeble light is emitted onto the non-rendered area. A weak current flows through a photoreceptor portion which receives the feeble light, and there, some of electric charges become lost, but the potential remains. A strong current flows through a photoreceptor portion which receives the strong emitted light, and there, electric charges become lost, and the potential vanishes. Thus, a general electrophotographic image can be reproduced by performing an adjustment so that the potential of the photoreceptor portion which receives the feeble light becomes equivalent to a potential for general lithography. Therefore, the lithography unit may change light emission control to subject the non-rendered area to whole image exposure to weak light and thereby adjust the charging potential, in order to reduce the excessively high charging potential.

Figure 5:
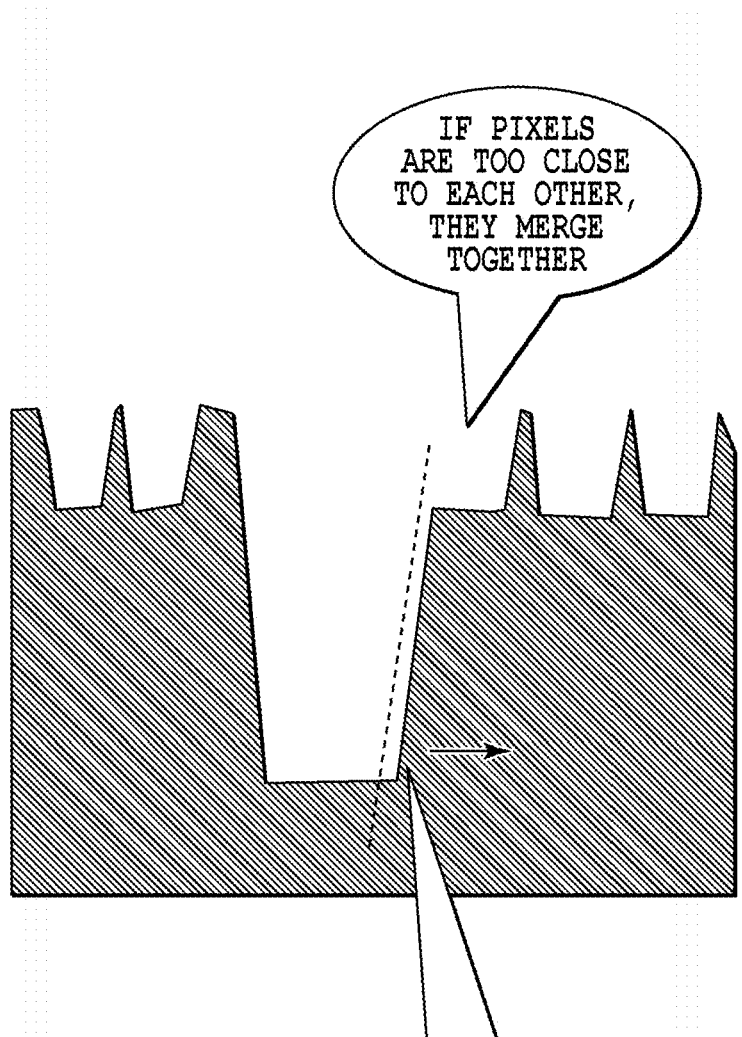
FIG. 5 is a representation illustrating the merging together of pixels caused by exposures performed on a lithographing area and the non-lithographing area.

However, a problem arises with mere control such that the rendered area is subjected to strong light emission and the non-rendered area is subjected to feeble light emission. Generally, the lithography unit is constructed of a laser. In a case of the laser, light emission time is controlled by performing control so as to keep the amount of light emission constant. A laser beam has the property of spreading in the form of Gaussian distribution, and, in a case where a lithographed pixel is in close proximity to a feeble light-exposed pixel, the spreading of a laser beam spot causes the pixels to merge together, thus slightly spreading the charged image. FIG. 5 is a schematic representation illustrating the merging together of the pixels caused by exposures performed on the rendered area and the non-rendered area. FIG. 5 schematically illustrates adhesion of the toner also to an unintended area, or equivalently, the non-rendered area in close proximity to the rendered area. Thus, the merging together of the pixels caused by the exposures performed on the rendered area and the non-rendered area leads to a minuscule increase in the amount of toner adhesion and hence to variations in density.

Such density variations may cause a pixel in the rendered area to become slightly thick. Also, laser light emission has difficulty in adjusting the amount of light, and thus, the whole amount of light is adjusted by emitting light to discrete pixels, not by subjecting all pixels uniformly to feeble light exposure. As previously mentioned, the spreading of the laser beam spot causes valleys of potential latent images to be loosely linked together even with discrete light emissions, thus enabling uniform potential correction. Therefore, the uniform potential correction can be accomplished by performing the feeble light exposure using a cyclical pattern.

However, in a case where an exposure pattern for the feeble light exposure on the non-rendered area is the cyclical pattern as described above, the density variations occur cyclically and become noticeable. Further, generally, cyclical halftone processing is also performed on the rendered area, and interference may occur between the cycles of the halftone and the cycles of the feeble light exposure and hence become a factor that causes image quality degradation such as moiré.

In the embodiments, therefore, control is performed so as to match the cycles of the halftone to the cycles of the feeble light exposure. Such control enables preventing the interference from occurring between the cycles of the halftone and the cycles of the feeble light exposure and thus causing the occurrence of moiré.

Note that description has been given above taking an instance where a laser diode is used as a light source, but an equivalent technique may be applied to a printing unit configured to perform optical lithography using an LED (light emitting diode) array or the like, although individual light sources are different in light distribution form.

The specific embodiments will be described below based on the above outlines.

Embodiment 1

[Synthesis of Print Information and Charging Potential Correction Pattern]

As previously mentioned, Embodiment 1 needs a method to synchronize the phase of an image tone processing pattern to the phase of a feeble light exposure pattern, in addition to a configuration of a typical image forming apparatus. Also, a light emitting unit performs light emission for feeble light exposure, besides that for typical rendered data. A configuration of an image forming apparatus will be explained below.

[General Block Diagram of Image Forming Apparatus]

Figure 6:
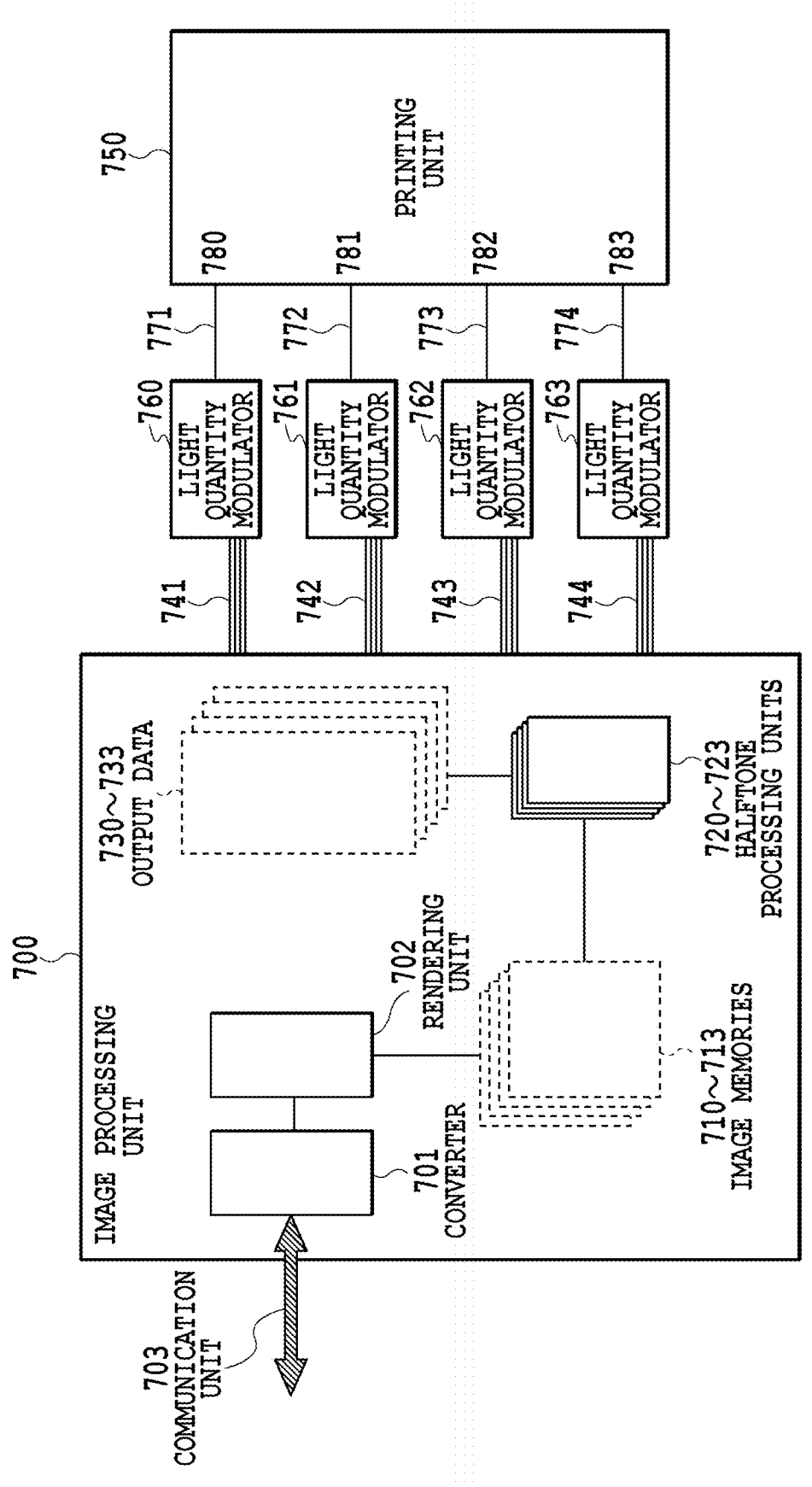
FIG. 6 is a diagram illustrating a configuration of an image forming apparatus according to Embodiment 1.

FIG. 6 illustrates a schematic block diagram of the overall image forming apparatus according to Embodiment 1. The image forming apparatus is broadly divided into and constructed of two parts: a printing unit 750 and an image processing unit 700. The image processing unit 700 communicates with an external device thereby to receive a rendering command or image data, and generates output data suitable for actuation of the printing unit 750.

[Basic Configuration of Image Processing Unit]

The image processing unit 700 includes a fixed storage unit, a processing unit, a temporary storage unit, and the like, which are not illustrated, in the same manner as a general computer configuration. Also, the image processing unit 700 is partially configured as hardware, in effective portions for speeding up transmission format conversion or level conversion for various communication lines, or processing, or in the like portion. Various functions are implemented in software in these hardware configurations.

FIG. 6 illustrates principal constituent blocks included in the image processing unit 700. The image processing unit 700 includes a communication unit 703, a converter 701, a rendering unit 702, image memories 710 to 713, and halftone processing units 720 to 723.

The communication unit 703 is constructed of hardware for decoding of data from a transmission format, and software for send/receive timing control or the like. The communication unit 703 allows the image forming apparatus to receive the rendering command or image data from the external device, an image input unit, or the like, which is not illustrated.

The converter 701 analyzes various externally inputted data to convert the various data into a form which is easy to handle internal to the image processing unit 700. Many external devices such for example as an image capture device treat an image as RGB or the like data, whereas the image forming apparatus is an apparatus for image formation by color development of pigments and thus performs processing to convert data into a CMYK or the like color space. Also, in a case where data received from the communication unit 703 is not the image data but is the rendering command, the converter 701 analyzes the rendering command described in various language systems, thereby to translate the rendering command into the rendering command to be processed by the image processing unit 700.

The rendering unit 702 generates rendered image data for each color from the various data converted into the easy-to-handle form. For example in a case where the converter 701 analyzes the rendering command, the rendering unit 702 loads the image data into the image memories 710 to 713 to generate rendered image data of multi-color tone. The rendered image data is multi-valued image data.

The image memories 710 to 713 store the rendered image data for each color, generated by the rendering unit.

The halftone processing units 720 to 723 convert the rendered image data for each color stored in the image memories 710 to 713 into output data as data in multi-valued representation for adaptation to characteristics of the printing unit. In other words, the halftone processing units 720 to 723 generate output data 730 to 733 suitable for the actuation of the electrophotographic printing unit 750.

The halftone processing units 720 to 723 are portions which generate and use phase information for tone processing. In the tone processing, a threshold table is used cyclically for each predetermined region for the rendered image data. The phase information is information indicating which pixel in the threshold table a pixel as a processing target corresponds to, and where the corresponding pixel is positioned in the threshold table. The halftone processing units 720 to 723 have the function of using such phase information for the tone processing, and specifying each pixel of an image for conversion into the amount of light representable by the printing unit, and are suitable for synchronization and addition of the feeble light exposure pattern. Thus, the halftone processing units 720 to 723 provide output data obtained by synthesizing the rendered image data with the feeble light exposure pattern. In Embodiment 1, the output data 730 to 733 generated by the halftone processing units 720 to 723 are produced as multi-valued data in order to distinguish between the feeble light exposure pattern and the rendered data. Each value in the output data also indicates the intensity of light emission for each pixel.

[Electrophotographic Tone Representation Method]

Next, description will be given with regard to an electrophotographic tone representation method. The electrophotographic halftone processing unit basically generates binary output data to realize halftone representation. In short, output data indicating whether or not to produce an output for each pixel is generated. However, charging of toner or a photoreceptor is susceptible to environmental humidity or temperature, and thus, an isolated pixel has difficulty even in binary representation, much less half tone level representation. In other words, rendered pixels, as being in a state of a pixel block formed of plural pixels linked together, are stable in representable density. In order to achieve the half tone level representation, therefore, a method based on the size of the pixel block larger than each individual pixel, rather than based on each individual pixel, leads to stable density representation. The halftone processing is processing which involves preparing a rendering area and a non-rendering area in a small region, and representing a density in the small region, based on an area ratio between the two areas. Thus, the halftone processing matches well with electrophotographic tone representation and hence can provide an image with high stability.

Figure 7:
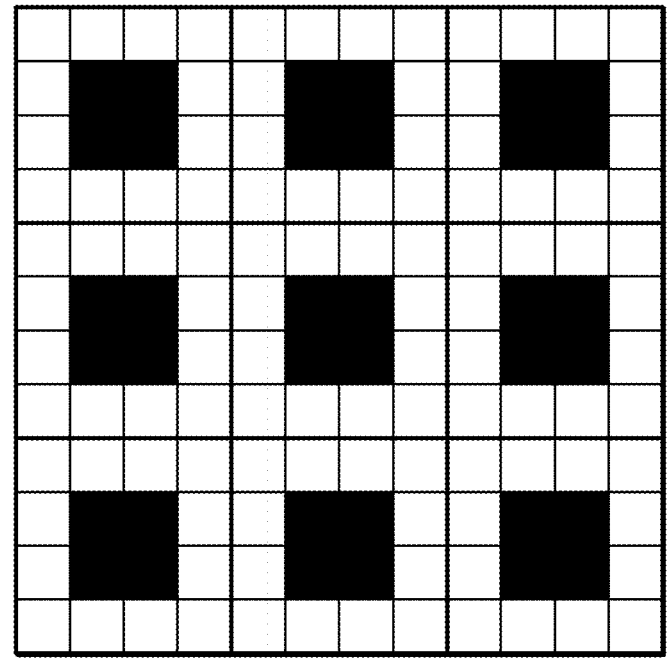
FIG. 7 is a representation of assistance in explaining tone representation by a pixel block according to Embodiment 1.
Figure 7:
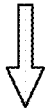
Figure 7:
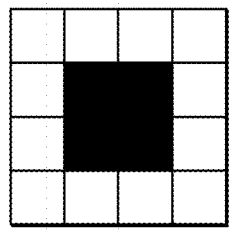
Figure 7:
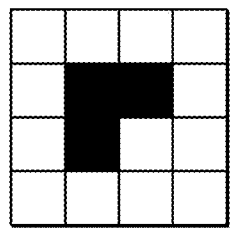
Figure 7:
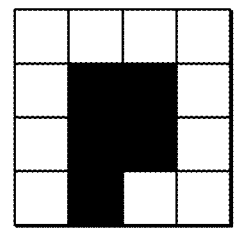

As described above, the halftone processing represents the density based on the pixel block larger than each individual pixel, and thus, the halftone processing is implementable, provided that each individual pixel can be represented basically in binary form. FIG. 7 is a representation of assistance in explaining density in an image, represented by the halftone processing. As illustrated in FIG. 7, the density in the image can be represented by dividing the image into small regions, and adjusting the area ratio between the rendering area and the non-rendering area in each small region. A high-resolution printing unit can ensure many pixels in each small region, thus enabling continuous tone representation of a natural image. The finer the screen cycles of the halftone processing, the smaller the number of pixels contained in each small region, which in turn reduces the number of steps of the intermediate tone level representation. By preparing the threshold table corresponding to each individual pixel in each small region, the halftone processing can generate a density representation image based on the area ratio as illustrated in FIG. 7, from multi-valued tone rendered image data. Specifically, each individual pixel in each small region in the rendered image data is compared, for each pixel, to a threshold in the corresponding threshold table, and a pixel having a pixel value equal to or more than the threshold is set to ON, while a pixel having a pixel value less than the threshold is set to OFF. Note that the threshold table is also called a dither matrix.

As described above, the halftone processing is implementable, provided that output data is in binary form; however, in Embodiment 1, output data including the feeble light exposure pattern for potential correction, besides the rendered image data in the halftone processing, is generated. Thus, the halftone processing unit generates multi-valued output data.

[Generation of Output Data with Synchronization of Halftone Processing and Feeble Light Exposure]

In order to perform cyclical screen processing as illustrated in FIG. 7, the halftone processing unit determines which pixel in the small region the pixel as the processing target corresponds to, and where the corresponding pixel is positioned in the small region. In other words, the halftone processing unit determines which phase in the small region the pixel as the processing target is located in. The phase information in the small region is calculated for example by obtaining remainders by dividing coordinate values of the pixel as the processing target by the screen cycle. The phase information corresponds to a pixel position in the small region. The halftone processing unit compares the corresponding threshold in the threshold table according to a phase value (or the pixel position) specified by the phase information, with the pixel value of the pixel as the processing target, thereby to determine whether or not to render the pixel as the processing target. Then, a pixel as the processing target is sequentially changed, and a determination based on the threshold is made for each pixel thereby to perform the cyclical screen processing.

Note that the screen processing by the halftone processing unit does not perform the screen processing on a non-rendered pixel whose pixel value is 0. Meanwhile, the aforementioned feeble light exposure pattern is added to the non-rendered pixel whose pixel value is 0.

Figure 8:
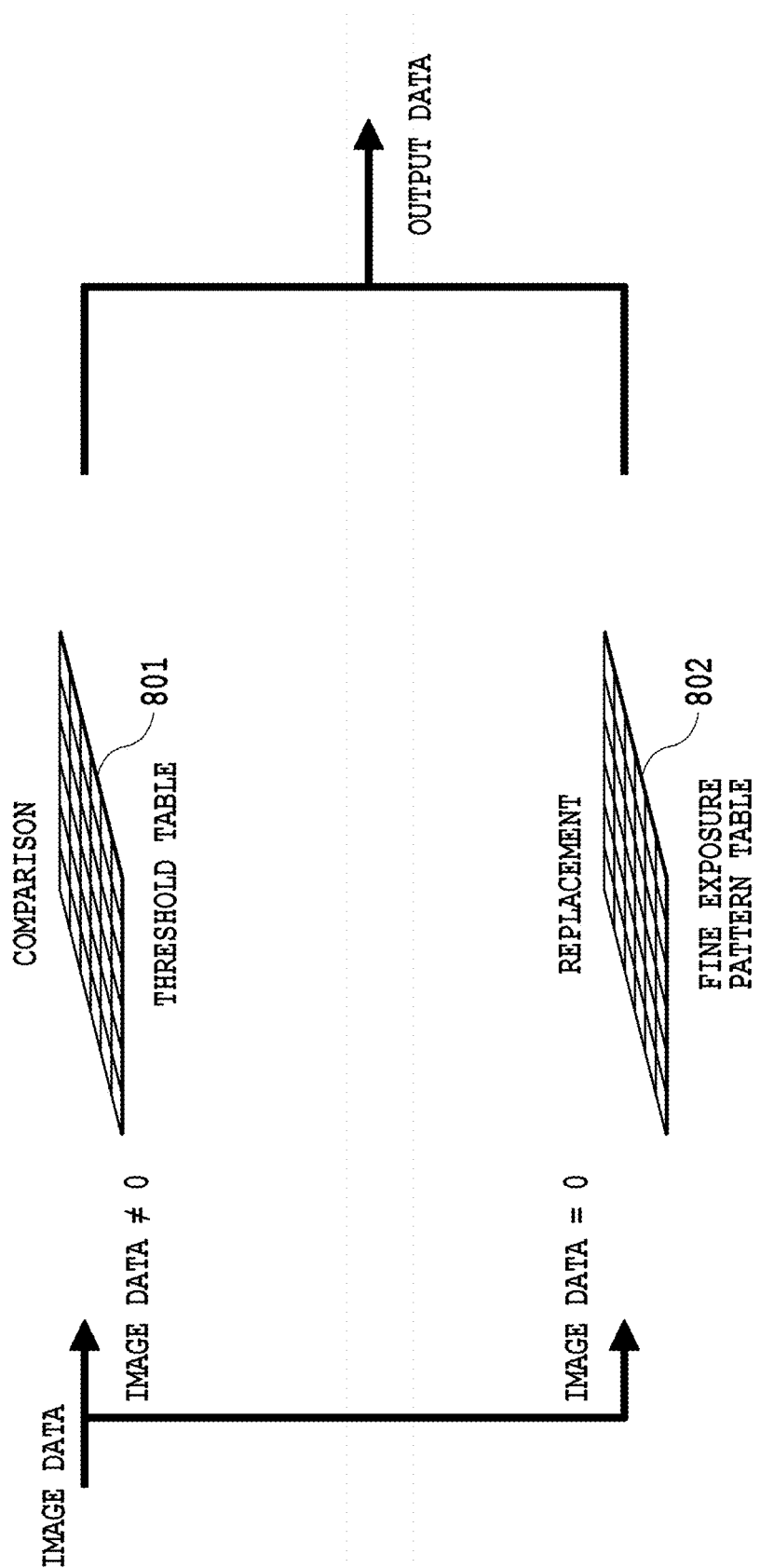
FIG. 8 is a representation of assistance in explaining outlines of processing by a halftone processing unit according to Embodiment 1.

FIG. 8 is a representation illustrating outlines of processing for generating output data obtained by adding the feeble light exposure pattern to the non-rendered pixel, which is performed by the halftone processing unit. In the screen processing, the feeble light exposure pattern is added in synchronization with the phase of the screen processing thereby to facilitate matching the phase of the feeble light exposure pattern to the phase of pattern processing for tone representation.

Therefore, a screen processing threshold table 801 and a feeble light exposure pattern table 802 having the same length and width dimensions are prepared. Using the screen processing threshold table 801 and the feeble light exposure pattern table 802 having the same length and width dimensions leads to a match between the cycles of the screen processing and the cycles of the feeble light exposure pattern. As previously explained, in a case where patterns having different cycles are used, moiré may occur with a width of the least common multiple of the different cycles. The occurrence of moiré can be prevented by matching the cycles of the screen processing to the cycles of the feeble light exposure pattern. In Embodiment 1, in a case where the pixel value of the processing target pixel is 0, the halftone processing unit uses the feeble light exposure pattern table 802 to convert the non-rendered pixel into a pixel having a feeble light exposure value. Note that the feeble light exposure is discretely performed as previously mentioned, and thus, the feeble light exposure values also include 0 as a value indicating that no exposure is performed.

In a case where the processing target pixel has some density, or equivalently, in a case where the processing target pixel has the pixel value other than zero, the halftone processing unit selects the screen processing threshold table. Then, a threshold corresponding to the phase value, stored in the threshold table, is selected, and whether or not to render the processing target pixel is determined by comparing the threshold with the pixel value of the processing target pixel.

Meanwhile, in a case where the processing target pixel is 0, or equivalently, in a case where the processing target pixel is a non-print area, in Embodiment 1, the halftone processing unit selects the feeble light exposure pattern table and determines that the feeble light exposure value according to the phase is an output value of the processing target pixel.

Thus, the halftone processing unit sets each pixel as the processing target pixel and determines the value of the pixel, and generates output data formed of the determined value.

Note that the size of the feeble light exposure pattern table is the same as that of the threshold table, and selection between patterns can be made by the tables sharing the phase information generated by the screen processing. Also, in a case where the processing target pixel is not 0, priority is given to typical screen processing, and thus, the feeble light exposure pattern does not prevent the screen processing. Thus, the processing as illustrated in FIG. 8 is performed thereby to enable efficient addition of the feeble light exposure pattern in synchronization with the screen processing.

[Multi-Valued Driven Image]

In Embodiment 1, besides typical print tone representation, the feeble light exposure for the potential correction is performed. Therefore, the amount of light emission is adjusted independently for each individual pixel of output data. The feeble light exposure is smaller in the amount of light as compared to typical lithography exposure, and thus, an optical lithography unit needs multi-valued light emission.

However, as previously mentioned, in a case where a semiconductor laser is used as the light source, it is difficult to change and stabilize the amount of light emission in a short time. Namely, laser scanning is short in scan time per pixel, and during the scan time it is difficult to change the amount of light from one amount to another amount and stabilize the amount of light. Therefore, PWM (pulse width modulation) is performed to control the amount of light irradiation per pixel by controlling light emission time without changing the amount of light.

Figure 9:
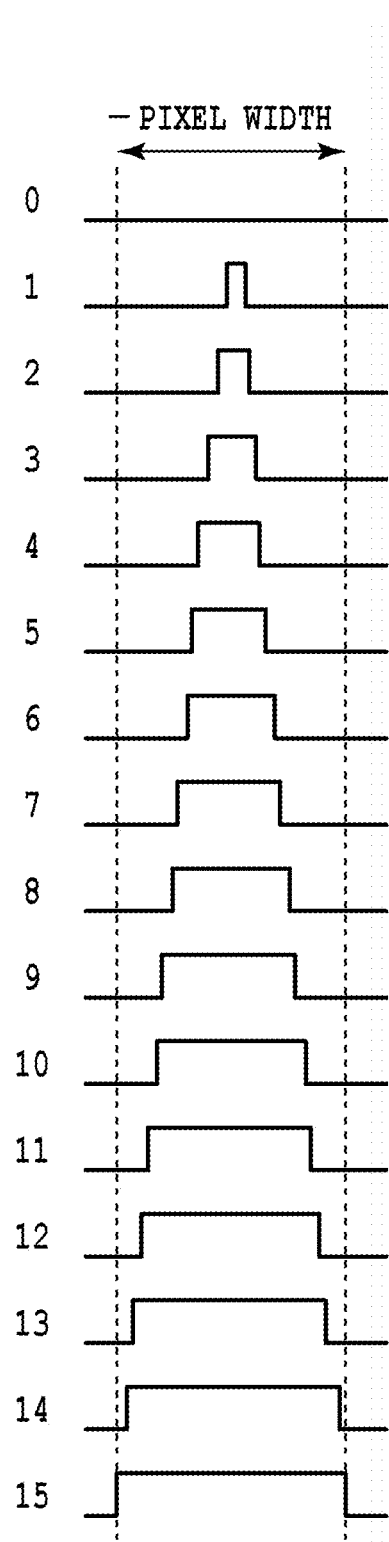
FIG. 9 is a chart of assistance in explaining pulse width control according to Embodiment 1.

FIG. 9 is a chart illustrating an example of PWM control of 16 levels of light emission time including a non-emission condition and a full-turn-on condition. The multi-valued amount of light irradiation is assigned to each individual pixel, and the amount of light for the feeble light exposure is controlled by assigning the amount of short-time light irradiation to a pixel among the individual pixels, which is to be subjected to the feeble light exposure. The output data 730 to 733 as the multi-valued data are outputted for each of colors through transmission lines 741 to 744 thereby to drive light quantity modulators 760 to 763, which then in turn perform PWM to control laser light sources 780 to 783. Outputs from the four light quantity modulators 760 to 763 drive the laser light sources 780 to 783 for the colors, respectively, of the printing unit 750 thereby to perform the feeble light exposure for the potential correction and typical latent image lithographing.

[Phase Synchronization Method]

In Embodiment 1, as previously explained, phase synchronization is performed in order to prevent interference such as moiré due to the screen processing for tone image representation and the feeble light exposure pattern. A simple method for implementing the phase synchronization involves preparing the feeble light exposure pattern having the same size as that of the threshold table for use in the screen processing, and adding the feeble light exposure in synchronization with the time of the screen processing.

The threshold table as illustrated for example in Table 1 is used to perform binarization screen processing on tone image data having a range of numerical values between 0 and 255. In this case, the feeble light exposure pattern table having the same size (6×6) as that of the threshold table is prepared as illustrated in Table 2. Note that Table 1 is exemplary of numerical values implemented in the threshold table 801 of FIG. 8, and Table 2 is exemplary of numerical values implemented in the feeble light exposure pattern table 802 of FIG. 8. The numerical values in the table in Table 1 indicate thresholds. A screen processing unit compares the pixel value of each pixel of the tone image data with the threshold thereby to determine the output value. Meanwhile, the numerical values in the table in Table 2 each indicate a light intensity command value for replacement of the output value of the non-rendering area, rather than the threshold. In other words, the numerical value corresponding to Table 2 is set as the output value.

TABLE 1

Threshold Table

| 147 | 154 | 161 | 168 | 175 | 182 |
| 140 | 49  | 56  | 63  | 70  | 189 |
| 133 | 42  | 7   | 14  | 77  | 196 |
| 126 | 35  | 28  | 21  | 84  | 203 |
| 119 | 112 | 105 | 98  | 91  | 210 |
| 252 | 245 | 238 | 231 | 224 | 217 |

TABLE 2

Feeble Light Exposure Pattern Table

| 1 | 0 | 0 | 2 | 0 | 1 |
| 0 | 1 | 1 | 0 | 0 | 2 |
| 0 | 2 | 0 | 1 | 1 | 0 |
| 1 | 0 | 0 | 2 | 0 | 1 |
| 0 | 1 | 1 | 0 | 0 | 2 |
| 0 | 2 | 0 | 1 | 1 | 0 |

Figure 10:
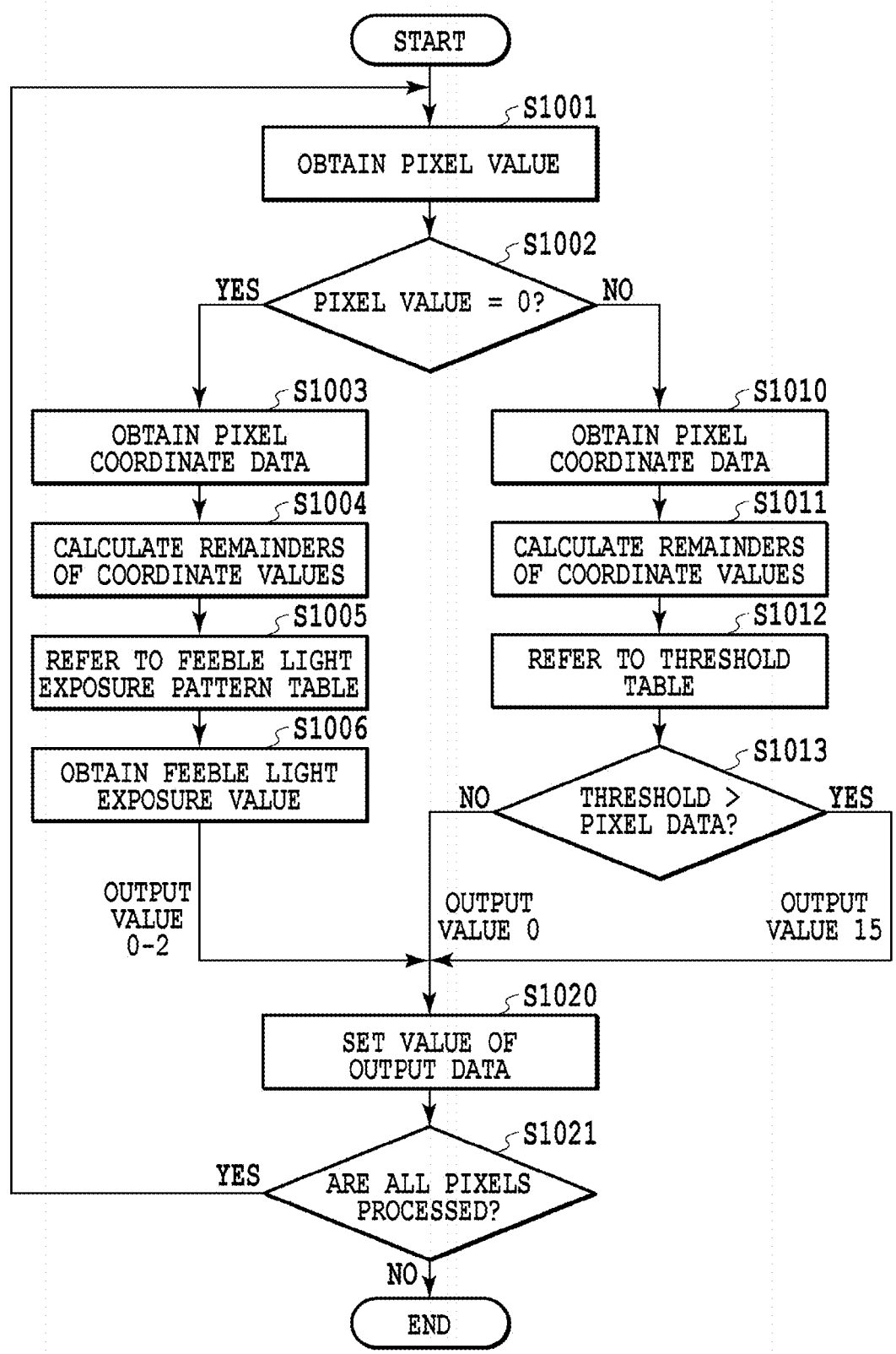
FIG. 10 is a chart of assistance in explaining a flow of processing by the halftone processing unit according to Embodiment 1.

Next, description will be given with regard to a flow of processing by the halftone processing unit. FIG. 10 is a chart illustrating an example of the flow of processing by the halftone processing unit of Embodiment 1.

At step S1001, the halftone processing unit obtains the pixel value of a processing target pixel of rendered image data stored in the image memory. At step S1002, the halftone processing unit makes a determination as to the pixel value of the processing target obtained at step S1001. If the pixel value is 0, the processing goes to step S1003, while on the other hand, if the pixel value is anything other than 0, the processing goes to step S1010.

If the pixel value is 0, an operation for replacing the pixel value with a value described in the feeble light exposure pattern is performed at steps S1003 to S1006.

At step S1003, the halftone processing unit obtains coordinate data of the processing target pixel. At step S1004, the halftone processing unit calculates remainders of the coordinates in main scanning and sub scanning directions, which are obtained at step S1003, with division by the screen cycle, thereby to determine the phase value of the screen. At step S1005, the halftone processing unit refers to the feeble light exposure pattern table as illustrated in Table 2. Then, at step S1006, the halftone processing unit selects the feeble light exposure value corresponding to the phase value calculated at step S1004, in the table referred to at step S1005. For example, in a case where pixel values in a certain small region are all 0, output values of pixels corresponding to the small region are converted into values illustrated in Table 2. Also, in a case where some pixel values are 0 and the other pixel values are other than 0 in a certain small region, a pixel having the phase (or position) corresponding to 0 is converted in a value illustrated in Table 2. In a case where the table illustrated in Table 2 is used, the output values obtained at steps S1003 to 1006 are any of 0 to 2. The output values correspond to 15-level values illustrated in FIG. 9, and in a case where the output value is 1 or 2, the pixel is subjected to light exposure in a short irradiation time, or equivalently, the feeble light exposure.

Meanwhile, in a case where the pixel value of the processing target pixel is not 0, the processing of steps S1010 to S1013 is performed. At steps S1010 to S1013, the same processing as general halftone processing is performed. At step S1010, the halftone processing unit obtains coordinate data of the processing target pixel in the same manner as step S1003. At step S1011, in the same manner as step S1004, the halftone processing unit calculates remainders of the coordinates in the main scanning and sub scanning directions with division by the screen cycle, thereby to determine the phase value of the screen.

At step S1012, the halftone processing unit refers to the threshold table. At step S1013, the halftone processing unit compares the pixel value of the processing target pixel with the threshold corresponding to the phase value calculated at step S1011. If the pixel value is equal to or more than the threshold, a determination is made that the output value, 15, corresponding to the maximum amount of light emission, illustrated in FIG. 9, is the output value of the processing target pixel. Meanwhile, if the pixel value is less than the threshold, a determination is made that the output value of the processing target pixel is 0 as a non-rendering value.

At step S1020, the halftone processing unit sets the output value as a result of step S1006 or S1013 to the value of each pixel of output data. At step S1021, the halftone processing unit determines whether all pixels have been processed as the processing target pixels. If there is an unprocessed pixel, the processing goes to step S1001, while on the other hand, if the processing of all pixels is completed, the flow of FIG. 10 is brought to an end. The printing unit drives a rendering unit, based on the output data thus generated. In other words, the output data is inputted as a light intensity command signal to the light quantity modulators 760 to 763 in synchronization with the timing of the printing unit.

[Configuration of Printing Unit]

Figure 11:
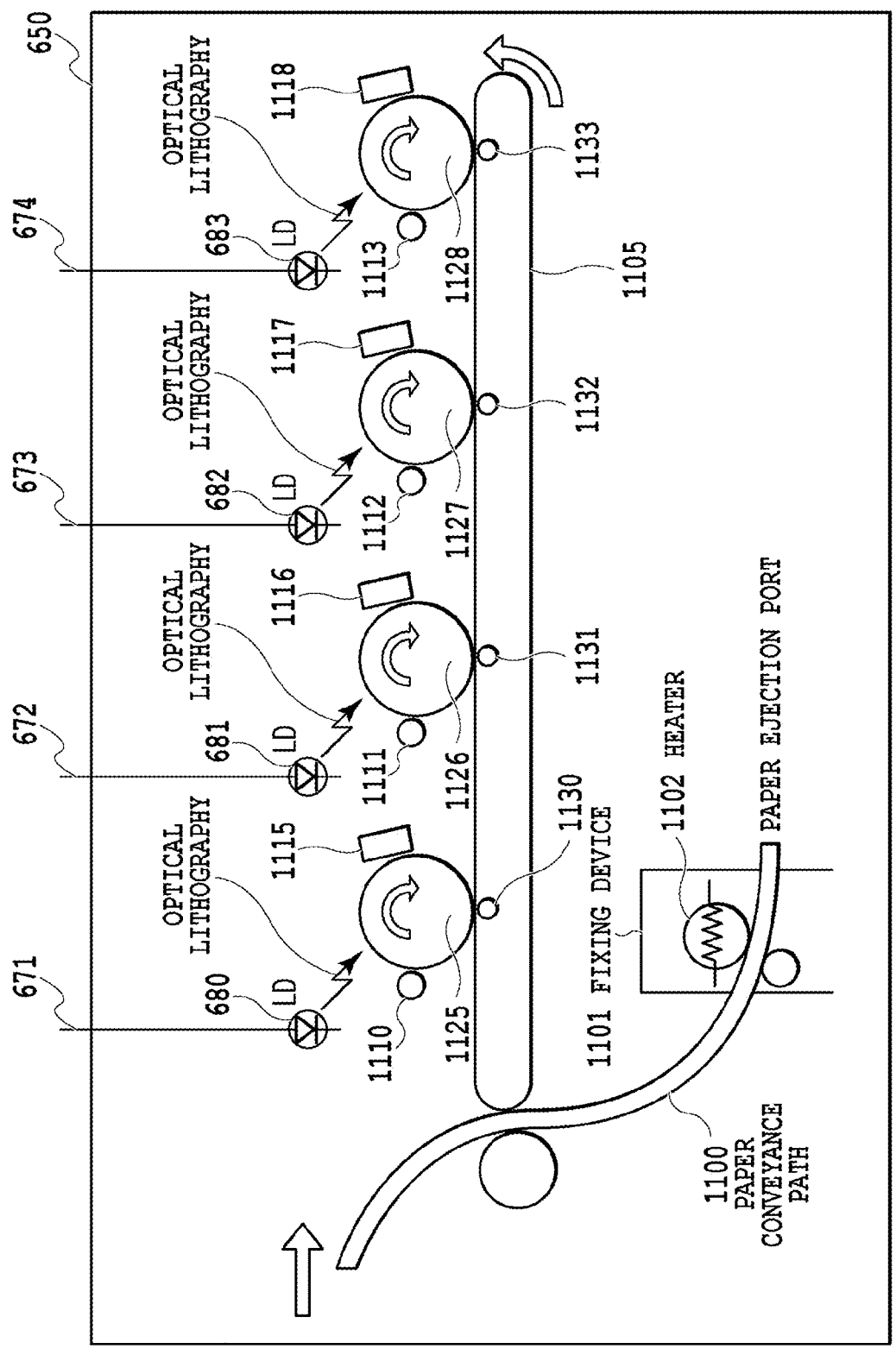
FIG. 11 is a diagram illustrating an example of a configuration of a printing unit according to Embodiment 1.

FIG. 11 is a diagram illustrating an example of a principal configuration of the printing unit 750. Although color reproduction can be said to be theoretically possible with three kinds of color materials, reproduction of light absorption characteristics of a black color is difficult with a mixture of three colors of color materials, and thus, black is typically added to use four kinds of color materials for color printing.

Also in Embodiment 1, an example of a configuration of the printing unit including an arrangement of four developing systems is given. Of course, a three-color configuration which sacrifices black reproducibility, or a configuration in which a special color such as white or metallic color, the reproduction of which is difficult with a combination of three colors, is added and thus five or more developing systems are present may be adopted. Developing systems for colors are constructed of charging units 1110 to 1118, lithography units 780 to 783, developing units 1115 to 1118, transfer units 1130 to 1133, and the like, respectively.

[Configuration of Developing System]

The developing system is in charge of development of each color. First, the surfaces of photoreceptors 1125 to 1128 are charged by the charging units 1110 to 1113, and potential latent images generated by optical lithography by the lithography units 780 to 783 are converted into toner images by the developing units 1115 to 1118. Then, the transfer units 1130 to 1133 transfer the toner images from the photoreceptors to a transfer belt 1105. The toner images of four colors are combined into one color image on the transfer belt, and the color image is transferred again to paper and then fixed to the paper by heat and pressure and is outputted as color printed matter. The paper is transported onto a paper conveyance path 1100, the toner images of four colors transferred from the transfer belt 1105 are fixed by a fixing device 1101, and the toner images are fixed to the paper to form a printed output. The fixing device 1101 fixes the toner images temporarily fixed to the surface of the paper by electric charge to the paper by heat and pressure. A heater 1102 temporarily heats and melts toner resin to assist in fixing to the paper.

[Electrophotographic Process in Embodiment 1]

In Embodiment 1, a toner image is formed on each photoreceptor drum in the following order. The charging unit charges the surface of the photoreceptor drum to increase the potential. In Embodiment 1, the photoreceptor drum is charged at a higher potential than a typical potential required to make a toner latent image.

Then, the lithography unit implemented as a laser light source for lithography performs optical lithography to vanish part of the electric charge on the surface of the photoreceptor drum and make a potential latent image. In a case where the optical lithography is used to form a two-dimensional latent image, any of the following methods may be used; specifically, the methods include a method in which an array of light sources is arranged corresponding to a width of paper, and a method in which one or a few light sources and rotary polygon mirrors are used in combination to perform scanning perpendicular to a direction of conveyance and thereby form a two-dimensional latent image in combination with the conveyance of the paper. In Embodiment 1, an example of optical scanning using the laser light source will be described. Note that a scanning unit such as the rotary polygon mirror, perpendicular to the direction of conveyance, is omitted and is not illustrated.

In Embodiment 1, at the time of lithographing by the lithography unit, feeble light exposure lithographing for cancelation of an excess charge is simultaneously performed in addition to typical latent image lithographing. Conventional lithography does not perform the optical scanning on the non-print area; however, in Embodiment 1, discrete feeble light emission lithographing is performed on the non-print area thereby to cancel the excess charge. At this time, a difference in light intensity between typical lithography and the feeble light exposure is determined by the light quantity modulators 760 to 763. In a feeble-exposed area, part of the electric charge become lost, but the potential remains and toner does not adhere to the area. The feeble light exposure controls a potential difference between a latent image and a non-print portion to a proper potential difference, and excessive adhesion of toner does not occur even in the image forming apparatus which takes measures for the aforementioned ghost between different colors.

A potential latent image having the proper potential difference is generated by the typical exposure and the feeble light exposure and is developed by the developing units 1115 to 1118. The developing units 1115 to 1118 charge the toner as resin flakes containing the color materials with an electric charge in the same direction as that of a surface potential of the photoreceptors, thereby to supply the toner onto the photoreceptor drums. The toner supplied onto the photoreceptors avoids the feeble-exposed areas where the electric potential remains, and the toner adheres to the portions in which the electric charges have vanished by the optical lithography. In short, the developing units 1115 to 1118 convert the typically lithographed areas of the photoreceptors into the toner image.

The single-color toner image developed on the photoreceptor drums is sequentially transferred from the photoreceptor drums 1125 to 1128 to the transfer belt 1105, and single-color images are superimposed one on top of another to form a color image on the transfer belt. In the process of superimposing the single-color images the transfer belt, the photoreceptor drum 1128 on the most upstream side is not affected since there is nothing on the transfer belt 1105. However, when the photoreceptor drums 1125 to 1127 on the downstream side contact the transfer belt 1105, one to three of the toner image layers on the upstream side are present on the surface of on the transfer belt 1105. At this time, the toner is kept charged, and toner charged image is present on the surface of on the transfer belt 1105.

The toner image is transferred in a portion in which each photoreceptor drum is in close proximity to the transfer belt 1105. When the toner moves from the photoreceptor to the transfer belt 1105, the upstream toner image charge on the surface of the transfer belt 1105 by the proximity affects the surface potential of the downstream photoreceptor. In the configuration of Embodiment 1, however, excess potential addition for relatively reducing an influence on the downstream surface potential, and canceling of the excess potential by the feeble light exposure are performed. Also, at this time, the control taking moiré into account is performed as previously mentioned, and thus, a high-quality image can be formed, while achieving a simplification of a discharging system. In other words, the phase of the feeble light exposure pattern matches the phase of the screen processing, and thus, in a single color, interference such as moiré does not occur between the screen processing and the feeble light exposure pattern, so that a good image can be outputted.

Embodiment 2

Methods for preventing interference between a rendered image and the feeble light exposure for charging potential correction may include a method which involves implementing a unit to separate a non-rendering area from a feeble light exposure addition area, thereby preventing moiré from occurring. For example, processing is conceivable which does not add the feeble light exposure to a rendered area and its vicinity area but adds the feeble light exposure to other areas. The rendered area and its vicinity area are separated from a feeble light exposure area thereby to enable preventing density variations due to the merging together of laser beams and thus enable performing control so as not to cause the occurrence of moiré.

Also in a form in which a unit configured to perform what is called exclusion processing on the feeble light exposure pattern and the screen processing is implemented as is the case with the above-described configuration, the feeble light exposure pattern in synchronization with the cycles of the screen processing as described in Embodiment 1 may be adopted.

In Embodiment 2, an example of an image forming apparatus including a unit configured to perform exclusive control on the feeble light exposure pattern and the screen processing is given. In Embodiment 2, moreover, an example of a rendering system to provide multi-valued halftone processing is given.

[Supplementary Method for Multi-Valued Rendering Having Insufficient Tone Representation]

In a case where print resolution is as low as about 600 dpi and it is desired to output the screen processing using the number of lines equal to or more than 100, the number of pixels contained in a small region is small and the intermediate-tone level representation is insufficient. Therefore, multi-valued rendering is utilized in order to compensate for insufficient tone levels. Note that as previously mentioned, electrophotography cannot continuously control toner adhesion on each individual pixel even if the amount of light is simply converted into multi-valued form. However, a multi-valued rendering function is useful for purposes of fine adjustment of the size of a toner adhering area of a pixel block. The reason for this is that rendering with the intermediate amount of light, although being unstable on a single pixel, is effective for adjustment of the area size of an end portion of the pixel block rendered with the saturated amount of light. In other words, the intermediate amount of light is applied to a pixel of the end portion of the pixel block thereby to perform fine adjustment of the size of the pixel block and consequently enable controlling the tone of the pixel block.

Figure 12:
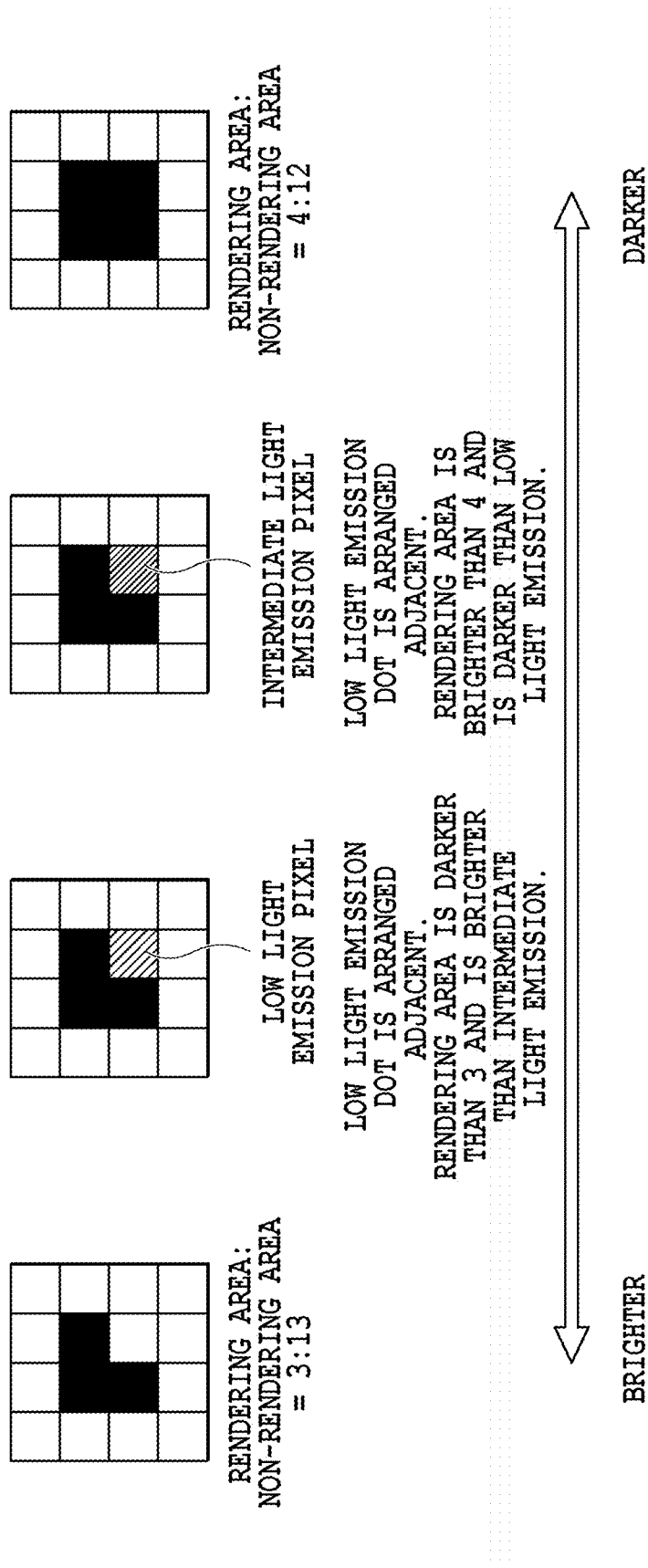
FIG. 12 is a representation of assistance in explaining multi-valued tone representation by a pixel block according to Embodiment 2.

FIG. 12 is a schematic representation of size adjustment of a pixel block by half tones. As illustrated in FIG. 12, the intermediate amount of light is applied to the end portion of the pixel block thereby to enable controlling the tone of the pixel block. Note that the intermediate amount of light in the end portion of the pixel block is easy to control because of being more stable than that on an isolated pixel by the influence of the laser beam on adjacent pixels, as distinct from the isolated pixel.

Figure 13:
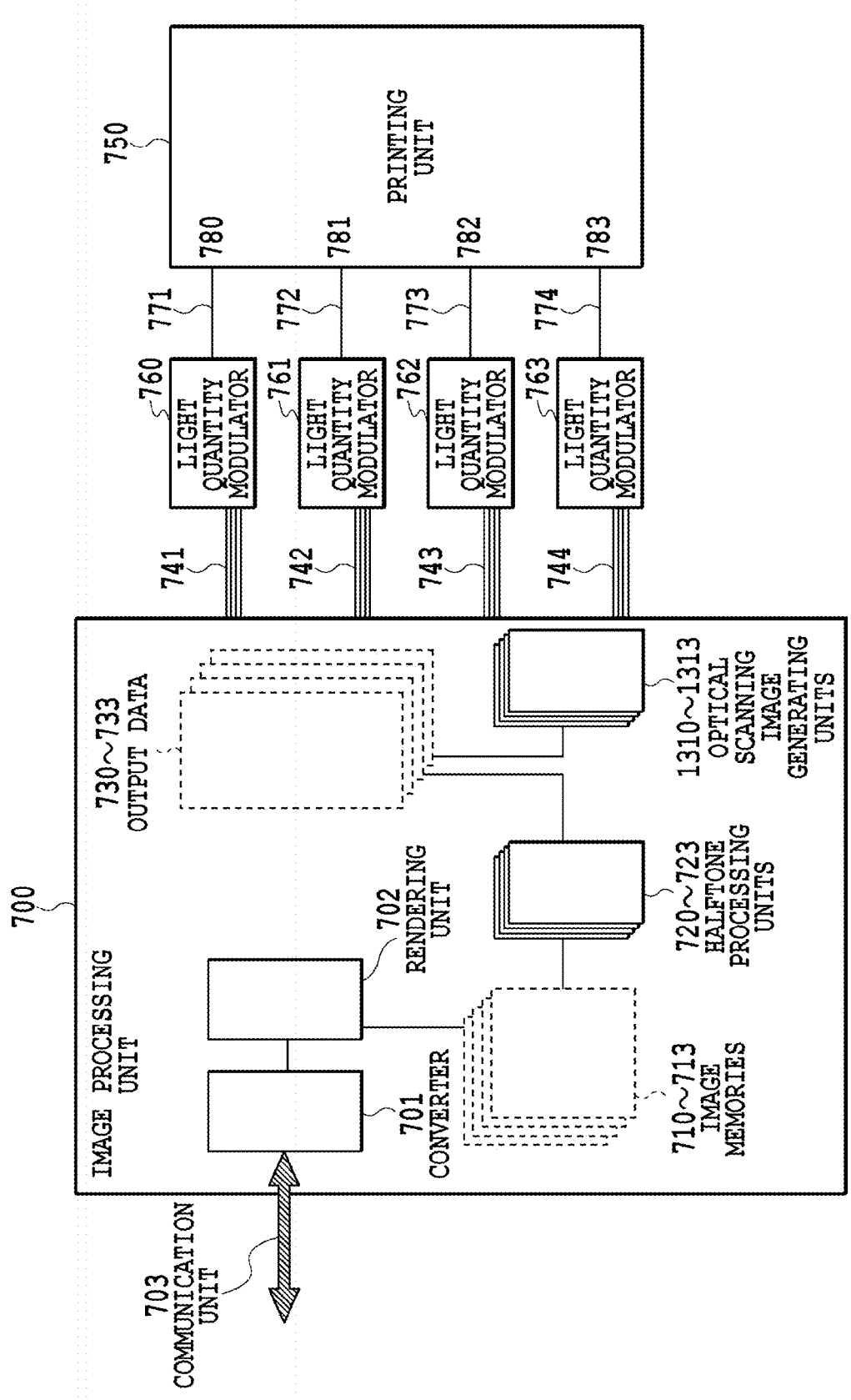
FIG. 13 is a diagram illustrating a configuration of an image forming apparatus according to Embodiment 2.

FIG. 13 illustrates a schematic block diagram of the overall image forming apparatus according to Embodiment 2. Embodiment 2 is different from Embodiment 1 in that optical scanning image generating units 1310 to 1313 are added to the following stage of the output data 730 to 733. The optical scanning image generating units 1310 to 1313 each include a detector to embed the feeble light exposure pattern in an area having no halftone processing pattern, and a feeble light exposure pattern adding unit.

The detector is provided with several lines of line buffers according to the scale of avoidance of the feeble light exposure pattern being adjacent to the halftone pattern. The line buffers are used to determine whether or not a pixel is a pixel having the halftone pattern or its vicinity pixel.

The feeble light exposure pattern adding unit includes the feeble light exposure pattern table as described in Embodiment 1. In this case, the feeble light exposure pattern table having the same cycles as the halftone cycles can be used as described in Embodiment 1. Note that the feeble light exposure pattern adding unit is mounted with a phase check circuit for selection of a numerical value in the table, as is the case with the halftone processing unit.

Figure 14:
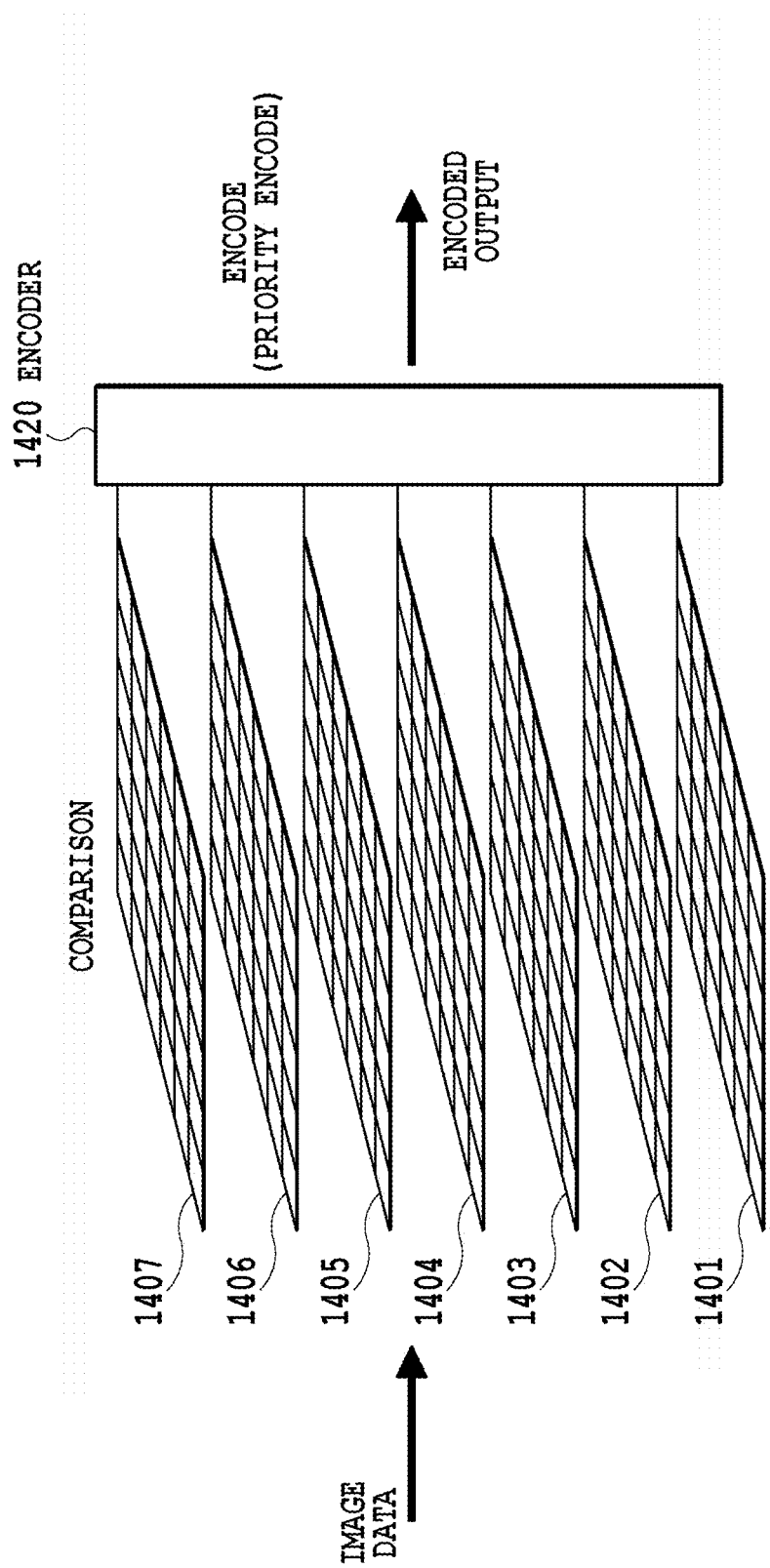
FIG. 14 is a representation of assistance in explaining outlines of processing by the halftone processing unit according to Embodiment 2.

In Embodiment 2, moreover, the feeble light exposure pattern table portion as described in Embodiment 1 is simplified, since any halftone processing unit will do, provided only that the halftone processing unit performs its intended halftone processing alone. Note that in Embodiment 2, multi-valued screen processing is performed, and thus, the number of threshold tables is increased in the halftone processing unit. Here, an example is given in which seven threshold tables 1401 to 1407 are prepared. Comparison starts at the lower-level threshold table, and then, in a case where image data in the image memory does not exceed the threshold, at that time a determination is made that the image data does not exceed the threshold in the upper-level threshold table, and a determination is aborted, and the output value is determined. For example, in an example of FIG. 14, in a case where a pixel having a certain phase value is less than a corresponding threshold in the threshold table 1401, the output value, 0, is assigned to the pixel. In a case where a pixel having a certain phase value is equal to or more than a threshold in the threshold table 1404 and is less than a corresponding threshold in the threshold table 1405, the output value, 5, is assigned to the pixel. An encoder 1420 thus encodes each individual threshold-based determination to select the proper intensity of light emission.

After the halftone processing has been performed to generate a screen processing pattern on the output data 730 to 733, the optical scanning image generating units 1310 to 1313 scan an image and perform processing for corresponding colors, respectively. Conditions for replacement with the feeble light exposure pattern are that "the value of a pixel in itself is 0" and, in addition, that "all vicinity pixels are 0" for separation of image areas, and a determination is made as to whether or not the conditions are satisfied.

Figure 15:
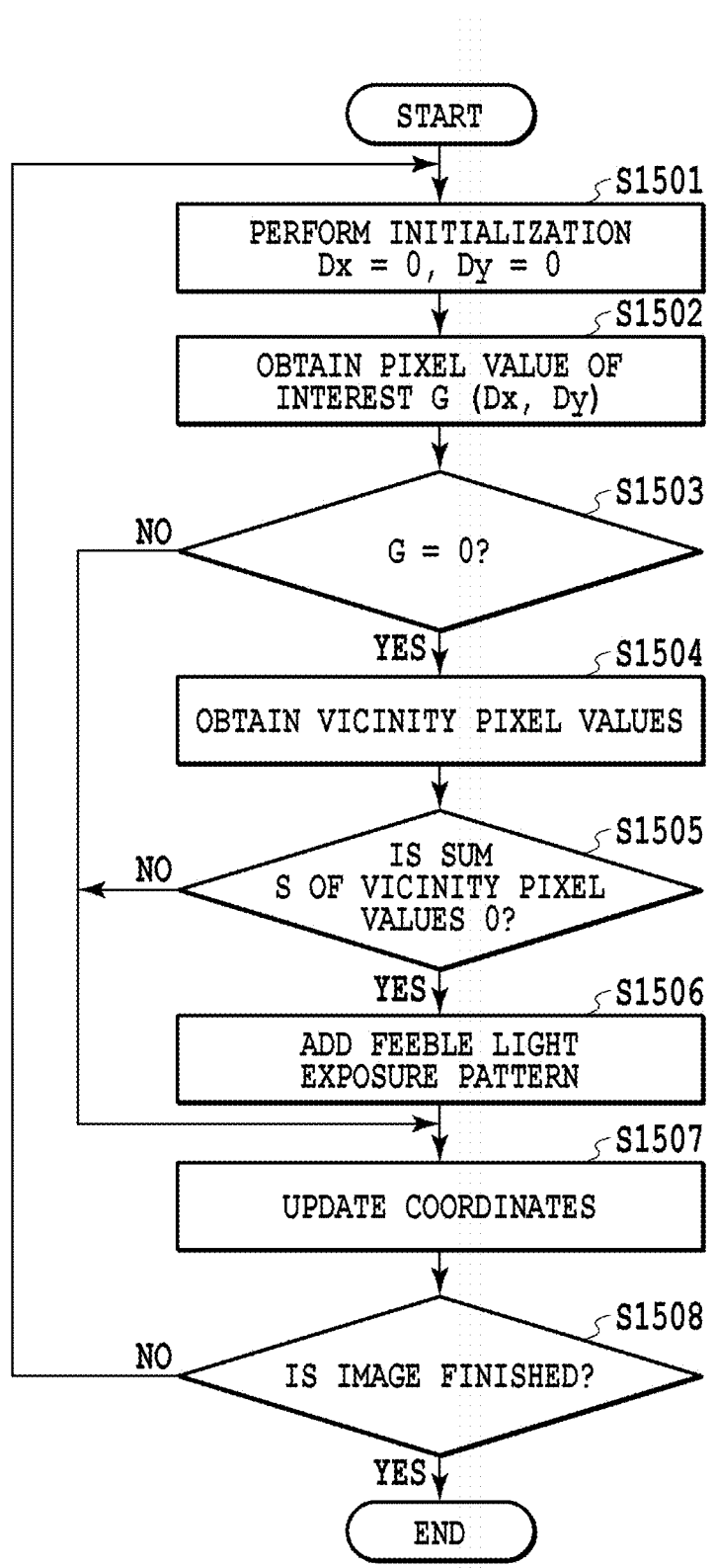
FIG. 15 is a chart of assistance in explaining a flow of processing by an optical scanning image generating unit according to Embodiment 2.

FIG. 15 illustrates a flow of processing by the optical scanning image generating unit. The optical scanning image generating unit scans output data from the halftone processing unit, and refers to a pixel of interest and its vicinity pixel.

At step S1501, the optical scanning image generating unit initializes a main scanning loop and a sub scanning loop. Here, (Dx, Dy) is set as coordinates of the pixel of interest. At step S1502, the optical scanning image generating unit obtains the pixel value of interest G (Dx, Dy).

At step S1503, if the pixel value of interest is not 0, it is unnecessary to check the vicinity pixel, and thus, the optical scanning image generating unit skips the processing and goes to step S1507. If the pixel value of interest is 0, at step S1504, the optical scanning image generating unit obtains the pixel value of a vicinity pixel group. In a case where Kx, Ky are defined as a vicinity reference range, the sum S of a rectangular region (Dx−Kx, Dy−Ky): (Dx+Kx, Dy+Ky) is integrated with respect to the coordinates (Dx, Dy) of the pixel of interest. Since the laser bean is not in circular form, vicinity distances Kx, Ky in main and sub scanning directions can be separately defined for generalization.

At step S1505, if the sum S of the vicinity pixel values is 0, the optical scanning image generating unit determines that the vicinity pixel whose value is other than 0 is absent, and adds the feeble light exposure pattern. Specifically, the remainders are calculated for the coordinates of the pixel of interest, by using the size of the threshold table for each color. Then, the feeble light exposure pattern value matched to the size of the threshold table for each color is extracted with the remainders set as an offset value, and replacement with the feeble light exposure pattern having a synchronized phase is performed.

At step S1507, the optical scanning image generating unit updates the coordinates of the pixel of interest, and repeats the processing until all scanning of the image is finished.

Replacement with the feeble light exposure pattern synchronized to the screen processing for each color adds the feeble light exposure pattern which avoids the vicinity of a rendered pixel.

Embodiment 3

[Common Multiple Cycle]

In Embodiments 1 and 2, a condition where the cycles of the screen processing perfectly match the cycles of the feeble light exposure pattern has been given; however, in a case where the screen cycle has a common divisor, the cycle of the feeble light exposure pattern may be a factor of the screen cycle divided by the common divisor. For example, in a case where the cycle of the screen is 12 pixels, the cycle of the feeble light exposure pattern may be 6, 4, or 3.

In a case where the following relationship, as generalized, is established: m×M=n×N, where N denotes the screen cycle; M, the cycle of the feeble light exposure pattern; and m, n, natural numbers, the value, m×M, is a repetitive cycle. In a case where the repetitive cycle of m×M is a long cycle, the occurrence of moiré is easily visually recognized, which in turn is undesirable. Therefore, it is preferable to use the feeble light exposure pattern such that the following relationship is established: m×M×pixel size<K, where K denotes a permissible length of a moiré cycle.

[Screen Cycle for Commercial Printing]

The cycle of the screen of printed matter for use in commercial printing is around 100 lines per inch for a newspaper or the like having poor paper quality, or is of the order of 150 to 175 lines per inch for a general magazine or the like. Desirably, m is as close to 1 as possible; however, in a case where the screen processing in itself exceeds 200 lines, even if m=2, the cycle falls within about the same cycle as the screen processing having a cycle of 100 lines for the commercial printing, and thus, no problem arises in terms of practical use.

In Embodiment 3, an example of a configuration in a case where the feeble light exposure pattern cycle is half of the screen cycle is given. Specifically, M=6; m=1; and n=2. For example, a feeble light exposure pattern table of Table 3 may be assigned to the threshold table having the size of Table 1 described in Embodiment 1.

Figure 16:
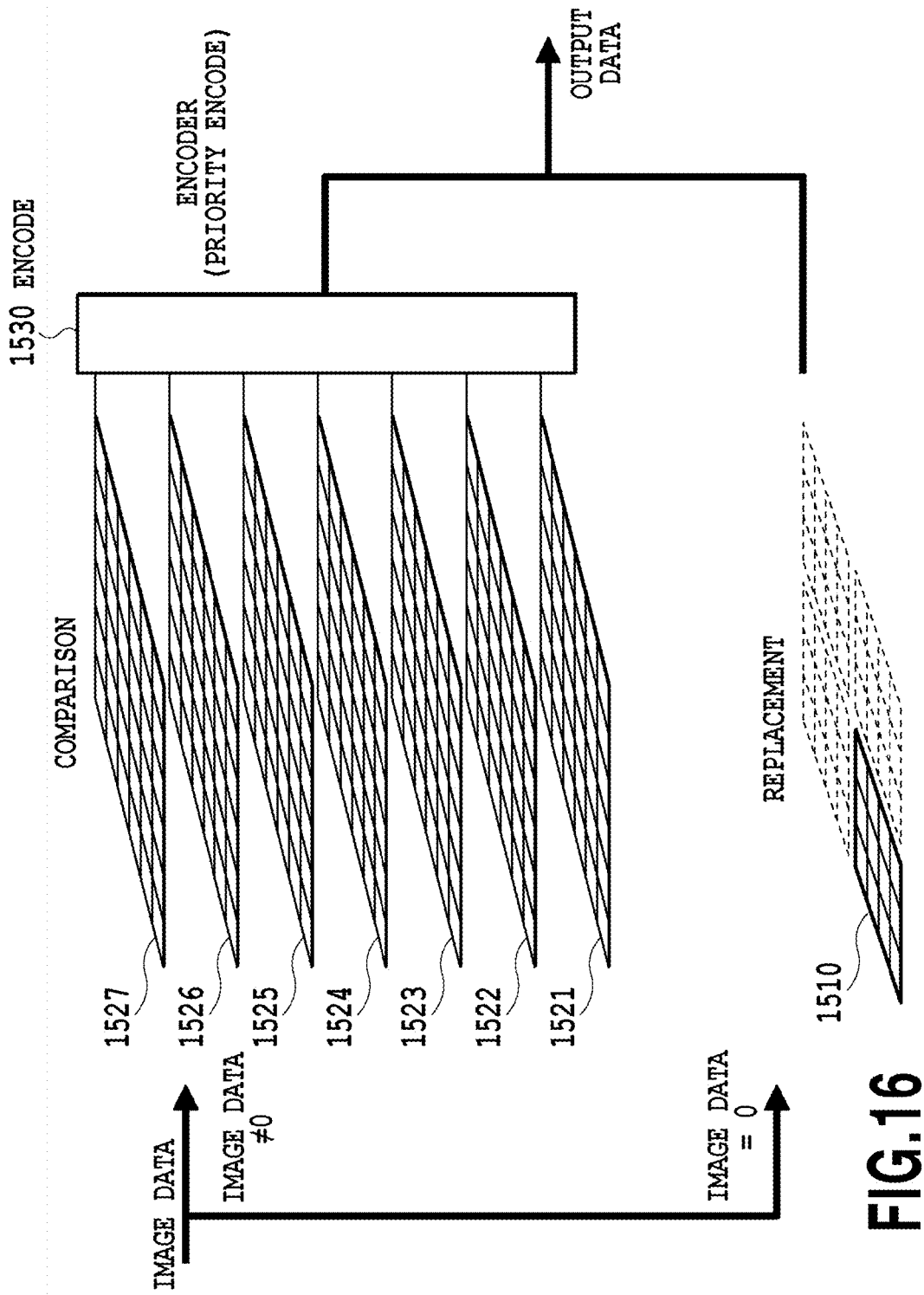
FIG. 16 is a representation of assistance in explaining outlines of processing by the halftone processing unit according to Embodiment 3.

FIG. 16 illustrates an example of halftone processing for generating a rendered image in a case where the feeble light exposure pattern in Embodiment 3 is added to a screen processing system. In this example, the cycle of the feeble light exposure pattern is half of the cycle of the screen processing, and therefore, a remainder with division by the screen cycle is further divided by n=2, and a resultant value is used as a phase value in the feeble light exposure pattern table. FIG. 16 is a representation of assistance in explaining outlines of the screen processing in Embodiment 3. In Embodiment 3, an example is given in which threshold tables 1521 to 1527 are used to perform the multi-valued screen processing, as is the case with Embodiment 2. An encoder 1530 determines an output value from a result of determination by each threshold table. Then, a feeble light exposure pattern table 1510 is repeatedly used as indicated by dashed lines in FIG. 16.

TABLE 3

Feeble Light Exposure Pattern Table (Part 2)

| | | |
|---|---|---|
| 2 | 0 | 1 |
| 0 | 1 | 2 |
| 1 | 2 | 0 |

In Embodiment 3, as described above, processing with moiré reduced can be achieved even in a case where the feeble light exposure pattern having a different cycle from the screen cycle is used.

In Embodiment 1, description has been given with regard to an example in which the halftone processing unit internally refers to the pixel value to determine whether to perform the screen processing or add the feeble light exposure pattern, according to whether or not the pixel value is 0, thereby to perform switching based on a determined result. However, the processing for adding the feeble light exposure pattern may be performed separately from the processing by the halftone processing unit, as described in Embodiment 2. Specifically, halftone-processed output data may be subjected to processing for adding the feeble light exposure pattern having the same cycle as the screen cycle or having the cycle of a divisor of the screen cycle. In this case, in the halftone processing, the output value of a pixel having the pixel value equal to or more than the threshold and having the feeble light exposure pattern added thereto remains maximum, while on the other hand, the output value of a pixel having the pixel value less than the threshold and having the feeble light exposure pattern added thereto is a value specified by the feeble light exposure pattern. Thus, the binarization screen processing, even if separate from the processing by the halftone processing unit, uses the feeble light exposure pattern having the same cycle as the screen cycle or having the cycle of a divisor of the screen cycle, thereby to enable achieving the same advantageous effects as those of the aforementioned embodiments.

Also, in a case where the screen cycles are different for each color, the feeble light exposure patterns having the screen cycles for each color may be applied for each color.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083860, filed Apr. 15, 2014, which is hereby incorporated by reference wherein in its entirety.

What is claimed is:

1. An image forming apparatus comprising:
an applying unit configured to apply a dither matrix to multi-valued image data; and
an exposure unit configured to perform an exposure on a photoreceptor drum based on the image data obtained by using the dither matrix applied by the applying unit,
wherein the exposure unit is configured to perform additional amount of exposure on the photoreceptor drum in a cycle equal to a cycle of the dither matrix, in addition to an amount of the exposure based on the obtained image data.

2. An image forming apparatus comprising:
an applying unit configured to apply a dither matrix to multi-valued image data; and
an exposure unit configured to perform an exposure on a photoreceptor drum based on the image data obtained by using the dither matrix applied by the applying unit,
wherein the exposure unit is configured to perform additional amount of exposure on the photoreceptor drum in a cycle being a factor of a cycle of the dither matrix divided by a divisor, in addition to an amount of the exposure based on the obtained image data.

3. The image forming apparatus according to claim 1, wherein the exposure unit performs the additional amount of exposure on a pixel whose pixel value is 0, in the multi-valued image data.

4. The image forming apparatus according to claim 1, wherein the exposure unit performs the additional amount of exposure on a pixel of interest, wherein values of pixels located in a predetermined range from the pixel of interest in the obtained image data are 0.

5. The image forming apparatus according to claim 3, wherein the exposure unit performs the exposure on a part of target pixels for the additional amount of exposure.

6. The image forming apparatus according to claim 1, wherein
the applying unit applies a dither matrix corresponding to each color,
an exposure unit and a photoreceptor drum are provided for each color, and
each exposure unit performs the exposure on the corresponding photoreceptor drum of each color in each cycle corresponding to a cycle of each dither matrix.

7. The image forming apparatus according to claim 1, comprising:
a charging unit configured to charge the photoreceptor drum,
wherein the charging unit increases a charging potential to such an extent that the exposure unit is able to cancel a potential of the photoreceptor drum by performing the exposure on the photoreceptor drum in the cycle equal to the cycle of the dither matrix.

8. An image forming apparatus including a developing unit provided for each color, comprising:

an exposure unit configured to perform exposure on a photoreceptor drum using a value obtained by using a feeble light exposure pattern for charging potential correction in tone representation for one of the colors, and a value obtained by screen processing according to a screen for the tone representation for the color, wherein the feeble light exposure pattern is formed to establish the following relationships:

$$m \times M = n \times N, \text{ and}$$

(m×M×pixel size) is less than a threshold, where M denotes a cycle of the feeble light exposure pattern, N denotes a cycle of the screen, and m, n are natural numbers.

9. An image processing apparatus comprising:

an input unit configured to input multi-valued image data;

a determining unit configured to determine whether or not a pixel value of a pixel of interest of the inputted multi-valued image data is 0; and an output unit configured to output output data, wherein the output data includes:

a value obtained by applying a dither matrix to the pixel value of the pixel of interest which is determined by the determining unit as having a pixel value other than 0, and a value obtained by replacing the pixel value of the pixel of interest which is determined by the determining unit as having a pixel value of 0, with a value of a pattern having a cycle equal to a cycle of the dither matrix or a cycle being a factor of the cycle of the dither matrix divided by a divisor thereof.

10. An image forming method comprising the steps of:

applying a dither matrix to multi-valued image data; and performing, by an exposure unit, an exposure on a photoreceptor drum based on the image data obtained by using the dither matrix applied in the applying step, wherein the performing the exposure includes performing additional amount of exposure on the photoreceptor drum in a cycle equal to a cycle of the dither matrix, in addition to an amount of the exposure based on the obtained image data.

11. An image forming method comprising the steps of:

applying a dither matrix to multi-valued image data; and performing, by an exposure unit, an exposure on a photoreceptor drum based on the image data obtained by using the dither matrix in the applying step, wherein the performing the exposure includes performing additional amount of exposure on the photoreceptor drum in a cycle being a factor of a cycle of the dither matrix divided by a divisor, in addition to an amount of the exposure based on the obtained image data.

12. A control method in an image forming apparatus including a developing unit provided for each color, comprising the steps of:

performing, by an exposure unit, an exposure on a photoreceptor drum using a value obtained by using a feeble light exposure pattern for charging potential correction in tone representation for one of the colors, and a value obtained by screen processing according to a screen for the tone representation for the color, wherein the feeble light exposure pattern is formed to establish the following relationships:

$$m \times M = n \times N, \text{ and}$$

(m×M×pixel size) is less than a threshold, where M denotes a cycle of the feeble light exposure pattern, N denotes a cycle of the screen, and m, n are natural numbers.

13. An image processing method comprising the steps of:

inputting multi-valued image data;

determining whether or not a pixel value of a pixel of interest of the inputted multi-valued image data is 0; and outputting output data, wherein the output data includes:

a value obtained by applying a dither matrix to the pixel value of the pixel of interest which is determined in the determining step as having a pixel value other than 0, and a value obtained by replacing the pixel value of the pixel of interest which is determined in the determining step as having a pixel value of 0, with a value of a pattern having a cycle equal to a cycle of the dither matrix or a cycle being a factor of the cycle of the dither matrix divided by a divisor thereof.

14. A non-transitory computer readable storage medium storing a program which causes a computer to perform the image forming method according to claim 10.

* * * * *